(12) United States Patent
Zhidkov

(10) Patent No.: US 7,706,436 B2
(45) Date of Patent: Apr. 27, 2010

(54) DECISION-FEEDBACK EQUALIZER AND METHOD OF UPDATING FILTER COEFFICIENTS

(75) Inventor: Sergey Zhidkov, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1395 days.

(21) Appl. No.: 10/990,436

(22) Filed: Nov. 18, 2004

(65) Prior Publication Data

US 2005/0175081 A1     Aug. 11, 2005

(30) Foreign Application Priority Data

Feb. 5, 2004    (KR)   ...................... 10-2004-0007530

(51) Int. Cl.
*H03H 7/30*      (2006.01)

(52) U.S. Cl. ........................ 375/229; 375/230; 375/231; 375/232; 375/233; 375/234; 375/235; 375/236; 375/316; 375/324

(58) Field of Classification Search ......... 375/229–236, 375/265, 340, 341, 316, 324
See application file for complete search history.

(56) References Cited

U.S. PATENT DOCUMENTS

| | | | | |
|---|---|---|---|---|
| 5,303,264 | A * | 4/1994 | Ohsawa | ...................... 375/230 |
| 5,343,522 | A * | 8/1994 | Yatrou et al. | ............ 379/406.09 |
| 5,608,804 | A * | 3/1997 | Hirano | ..................... 381/71.12 |
| 5,757,855 | A * | 5/1998 | Strolle et al. | ................ 375/262 |
| 5,805,480 | A * | 9/1998 | Greenberg | ................... 708/322 |
| 6,201,839 | B1 * | 3/2001 | Kavcic et al. | ............... 375/341 |
| 7,418,034 | B2 * | 8/2008 | Xia et al. | ..................... 375/233 |
| 2002/0154247 | A1 | 10/2002 | Ghosh et al. | |
| 2002/0154248 | A1 | 10/2002 | Wittig et al. | |
| 2002/0172275 | A1 | 11/2002 | Birru | |
| 2002/0186762 | A1 | 12/2002 | Xia et al. | |
| 2002/0191689 | A1 | 12/2002 | Xia et al. | |
| 2002/0191716 | A1 | 12/2002 | Xia et al. | |
| 2003/0099289 | A1 | 5/2003 | Birru | |

FOREIGN PATENT DOCUMENTS

EP        0 889 612 A2     1/1999

OTHER PUBLICATIONS

Liu et. al., "Adaptive Channel Equalization for High-Speed Train", IEEE 1994.*
Liu, Weilin et al. "Adaptive Channel Equalization for High-Speed Train". IEEE, Jun. 1994, pp. 225-229.

(Continued)

*Primary Examiner*—Mohammad H Ghayour
*Assistant Examiner*—Sophia Vlahos
(74) *Attorney, Agent, or Firm*—Harness, Dickey & Pierce P.L.C.

(57) ABSTRACT

Exemplary embodiments of the present invention provide an equalizer combined with a decoder and a method of updating filter coefficients. The method may include calculating output error signals $e_k$, multiplying the output error signals by a parameter, obtaining a partial value by multiplying a delayed decoder decision stored in a filter delay line corresponding to an i-th filter coefficient by the result obtaining a partial value by multiplying a constant by a feedback coefficient and obtaining an updated value by adding the two partial values.

46 Claims, 16 Drawing Sheets

OTHER PUBLICATIONS

Mak, S. K et al. "Detection of Trellis-Coded Modulation on Time-Dispersive Channels." vol. 3, Nov. 18, 1996, pp. 1825-1829.

Murata, Hidekazu et al. "Co-channel Interference Canceller for Interleaved Coded Modulation in the Presence of Intersymbol Interference." IEEE Transactions on Communications, IEEE Service Center; vol. 37, No. 5, May 1989, pp. 428-436.

Ariyavisitakul, Sirikiat L. "Joint Coding and Decision Feedback Equalization for Broadband Wireless Channels." IEEE Journal on Selected Areas in Communications, vol. 16, No. 9, Dec. 1998, pp. 1670-1678.

Kubo, Hiroshi et al. "Adaptive Maximum-Likelihood Sequence Estimation by Means of Combined Equalization and Decoding in Fading Environments." IEEE Journal on Selected Areas of Communication, No. 1, Jan. 13, 1995, pp. 102-109.

French Search Report dated Sep. 25, 2006.

Forney, G.D., Jr. "Maximum-Likelihood Sequence Estimation of Digital Sequences in the Presence of Intersymbol Interference." IEEE Trans. Inform. Theory, vol. IT-18, May 1972, pp. 363-378.

Duel-Hallen, A. et al. "Delayed Decision-Feedback Sequence Estimation." IEEE Trans. Commun., vol. 37, No. 5, May 1989, pp. 428-436.

Underboeck, G. "Channel Coding with Multilevel/Phase Signals." IEEE Trans. Inform. Theory, vol. IT-28, No. 1, Jan. 1982, pp. 55-67.

Chevillat, P.R. et al. "Decoding of Trellis-encoded Signals in the Presence of Intersymbol Inteference and Noise." IEEE Trans. Commun., vol. 37, No. 7, Jul. 1989, pp. 669-676.

Wesolowski, K. "Performance of the receivers of trellis-coded data signals transmitted through HF channels." Fourth International Conference on HF Radio system and Techniques. Apr. 11-14, 1998, pp. 305-309.

Picchi, G. et al. "Blind Equalization and Carrier Recovery Using a 'Stop-and-Go' Decision Directed Algorithm." IEEE Trans. Commun., vol. COM-35, No. 9, Sep. 1987, pp. 877-887.

Proakis, John G. "Digital Communications". $4^{th}$ Ed., New York, McGraw-Hill, 2001.

Haykin, Simon. "Adaptive Filter Theory". $4^{th}$ Ed., Prentice-Hall Inc., 2002.

Office Action for corresponding Chinese Application No. 200510069794.8 dated Feb. 6, 2009 with English translation.

Weilin Liu, Hervé Romanens, ASCOM Tech Ltd, Gewebepark CH -5506 Mägenwil, Switzerland; Adaptive Channel Equalization for High-Speed Train; Jun. 1994; pp. 225-229 vol. 1.

\* cited by examiner

DECISION-FEEDBACK EQUALIZER AND METHOD OF UPDATING FILTER COEFFICIENTS

CROSS-REFERENCE TO RELATED APPLICATIONS

This U.S. nonprovisional patent application claims priority under 35 U.S.C. §119 of Korean Patent Application 2004-7530 filed on Feb. 5, 2004, the entire contents of which are hereby incorporated by reference.

BACKGROUND OF THE INVENTION

1. Field of the Invention

Exemplary embodiments of the present invention relate to digital video broadcasting, and more particularly, to a decision-feedback equalizer, which may receive a variety of digital information and a method of updating coefficients thereof.

2. Description of the Conventional Art

An equalizer for digital video broadcasting may be needed for large amounts of digital information, for example, voice, data, and/or video communications. Such digital information may be transmitted via various transmission mediums, which may have different transmission characteristics. Transmission mediums may cause different kinds of ghosting, for example, frequency-dependent phase, amplitude distortion, multipath receiving, or voice echoes, and various types of fading in signals, for example, Rayleigh fading. Data transmissions may suffer from a noise, for example, additive white Gaussian noise. The equalizer may be used to reduce echoes and/or video ghosts and control signals for wireless modems and/or telephones.

In digital communications, data transmission over intersymbol interference (ISI) channels may be a problem. The ISI may occur when pulsed information, for example, amplitude-modulated digital transmissions, may be transmitted over analog channels, for example, telephone lines and/or skywave channels.

Maximum-likelihood sequence estimation (MLSE) may achieve an improved symbol error rate (SER), but may become more complex with the length of the channel time dispersion. Extremely high complexity of the MLSE in a software and/or hardware may limit its use.

A linear equalizer (LE) may detect and equalize ISI. LE may have a complexity, which may be a linear function of the channel dispersion length and may suffer from significant noise enhancement. The performance of the linear equalizer may be worse than the performance of an MLSE.

A decision-feedback equalizer (DFE) may have a lower complexity and/or improved performance.

FIG. 1 is an example of a construction diagram of a conventional DFE. The DFE may use previously decoded data symbols in order to calculate and reduce intersymbol interference (ISI). The performance of the DFE may be degraded due to incorrect decisions in a decision feedback filter, for example, when a channel introduces strong ghosts, for example, during a single frequency network operation in digital television broadcasting.

Referring to FIG. 1, a DFE may include a feedforward filter 102, a feedback filter 103, a slicer 104, and an adder 105. A received digital signal 101 may be input to the feedforward filter 102.

The feedforward filter 102 may partially correct signal errors using a filter having a magnitude opposite to a magnitude of the input digital signal 101. The slicer 104 may be, for example, a decision device which may be based on the magnitudes of received signals and may classify received signals based on decisions of 0, ±2, ±4, and ±6 in order. The received signals may be classified into symbols corresponding to normalized signals of ±1, ±3, ±5, and ±7. The slider 104 may be a multi-dimensional slicer, which may be used in, for example, quadrature amplitude modulation (QAM) systems.

The adder 105 may add the output of the feedforward filter 102 and the output of the feedback filter 103 and may output the result to the slicer 104. The feedforward filter 102 may reduce noises using a filter having a magnitude opposite to a magnitude of the input digital signal 101.

A decision-feedback sequence estimation (DFSE) algorithm may provide a tradeoff between performance and complexity.

Wireless communication systems employ trellis-coded modulation (TCM).

FIG. 2 illustrates a conventional TCM scheme for 8-level amplitude modulated signals.

Referring to FIG. 2, a TCM encoder may be comprised of an 8-VSB trellis encoder 201 and an 8-level symbol mapper 203. The 8-VSB trellis encoder 201 may employ an 8-level 3-bit 1-dimensional arrangement. The 8-VSB trellis encoder may use a ⅔ rate trellis code.

A method for detection of trellis-coded symbols in channels without ISI may be the MLSE. The number of trellis states in codes used for TCM may be smaller and the complexity of the MLSE may not be higher. The MLSE may be implemented using a Viterbi algorithm (or Viterbi decoding algorithm). The TCM symbols transmitted through ISI-free channels may be detected with improved performance.

When channels introduce ISI, the MLSE detector which takes into account the ISI introduced by the channels and the TCM may become more complex. A DFE may be used for the compensation of channel ISI and a MLSE (Viterbi) decoder to decode the TCM.

FIG. 3 is a construction diagram of a conventional DFE combined with a TCM decoder.

Referring to FIG. 3, the DFE combined with the TCM decoder may comprise a feedforward filter 302, a feedback filter 303, a slicer 304, and an adder 305, and a TCM decoder 307 which may decode trellis-coded symbols. A received digital signal may be input to the DFE via an input line 301 and output via an output line 306 connected to the TCM decoder 307.

The DFE may be operated before the TCM decoder uses uncoded symbols to perform a feedback operation and the reliability of the uncoded symbols may be lower. The performance may be worse than that of a joint (channel+TCM) MLSE.

FIG. 4 is a construction diagram of another conventional DFE combined with a TCM decoder.

The DFSE algorithm may be used to decode TCM symbols transmitted through ISI channels.

Instead of using slicer decisions in a feedback filter, the DFE may use symbol decisions from the more likely surviving path of the Viterbi decoder. This scheme, sometimes referred to as "a Viterbi decoder with global decision feedback", is illustrated in FIG. 4. Referring to FIG. 4, an adder 407 may add the output of a feedforward filter 402 and the output of a feedback filter 403 and may output the result to a TCM decoder 404. The TCM decoder 404 may decode symbols 405 and inputs the decoded symbols 405 to the feedback filter 403. The Viterbi decoder with global decision feedback may use the symbol decisions from the more likely surviving path of the TCM (Viterbi) decoder 404 as the inputs of the feedback filter 403. A decoding depth Nth symbol, which may be the more reliable symbol among the outputs of the TCM decoder 404, may become an output signal 406.

This combination of a DFE and a TCM (Viterbi) decoder, as shown in FIG. 4, may have improved performance over the scheme shown in FIG. 3, since the decisions from the TCM (Viterbi) decoder may be more reliable.

FIG. 5 is a construction diagram of a conventional DFE, which may use a least-mean square (LMS) algorithm for updating feedback filter coefficients.

In, for example, wireless applications of MLSE and DFE, the channel transfer function may be unknown at the receiver and/or time-variant. Any detection/equalization scheme used in wireless communication receivers may be adaptive, i.e., may be able to change coefficients of an equalizer and track channel variations. In the LMS scheme, equalizer coefficients may be recursively updated at every iteration of the algorithm. For example, feedback filter coefficients of a DFE may recursively be updated in accordance with an LMS algorithm as shown in Equation 1.

$$b_i^{(k+1)} = b_i^{(k)} + \mu e_k \hat{d}_{k-i}, i=1, 2, \ldots, L_B \quad (1)$$

Here, $b_i^{(k)}$ are i-th feedback coefficients (518, 519, ..., and 520) of a DFE at k-th iteration, $L_B$ is the number of feedback filter coefficients, $\hat{d}_k$ are decisions in a feedback filter, stored in delay lines (521, 522, ..., and 523), $\mu$ is a step-size parameter (positive constant), and $e_k$ are error signals 508, which may be differences between the outputs 524 of the DFE and the decisions $\hat{d}_k$ 525. During a training period, the transmitted data sequence $d_k$ may be known and may be used by an equalizer to update the coefficients $b_i^{(k)}$ in accordance with the LMS algorithm shown in Equation 1.

A DFE, which may use the LMS adaptation scheme embodied by Equation 1, is shown in FIG. 5. That is, FIG. 5 illustrates an example of applying the LMS adaptation scheme shown in Equation 1 to the DFE using the slicer of FIG. 1. After a training period, decisions $\hat{d}_k$ at the output of a slicer 510 may be more reliable and the decisions $\hat{d}_k$ may be used to update equalizer coefficients in accordance with the LMS algorithm.

FIG. 6 is a construction diagram of a conventional DFE, which may use both the LMS algorithm and a Stop-and-Go algorithm to update feedback filter coefficients.

The LMS algorithm may also be used without a training sequence.

The "Stop-and-Go" algorithm may disable adaptation if decisions are not reliable, and may update equalizer coefficients if the decisions are more likely to be correct. Detection of less reliable decisions and/or generation of enable/disable flags 623 may be performed in a 'Stop-and-Go' (SAG) block 618.

FIG. 7 is a construction diagram of a conventional DFE combined with a trellis decoder, which may use an LMS adaptation algorithm to update feedback filter coefficients.

The LMS algorithm shown in Equation 1 and its 'Stop-and-Go' variant may be used with the DDFSE scheme shown in FIG. 4.

The combined equalizer/decoder structure with the LMS adaptation algorithm shown in FIG. 7 may introduce an instability problem. An example of the instability of this scheme is illustrated in FIG. 8.

FIG. 8 is a graph showing the signal-to-noise ratio (SNR) versus the number of iterations for the DFE shown in FIG. 7.

FIG. 8 shows the simulation results for the DFE combined with the TCM Viterbi decoder shown in FIG. 7. A channel may have three equal, or substantially equal, amplitude paths and a transmission system may use 8-level amplitude modulated signals as shown in FIG. 2. The equalizer steady-state operation shown in FIG. 8 may not depend on resolution of the equalizer coefficients or overflow effects and may be a result of the TCM decision feedback properties.

For first periods of time, the DFE may be operated such that signal-to-noise ratio (SNR) may be more stable. After some periods of time, the stability of the SNR may be greatly lower and a variation thereof may be repeated periodically as the number of iterations increases.

In a convergence region, contribution of the decision-feedback part of the equalizer in ISI compensation may be insignificant, since decisions may be less reliable and the equalizer of FIG. 7 may not rely on the decision feedback mechanism. Decision errors may not affect equalizer stability in this region, and output signal-to-noise ratio (SNR) may be more stable.

After some period of time when decisions become more reliable, the equalizer may rely on these decisions and may use a feedback filter for ISI compensation.

FIG. 9A is a graph showing an example of the percentage of decision errors in the slicer and the TCM decoder as a function of time.

The TCM decision errors may be correlated and may group in error bursts rather than be distributed randomly as in the case of slicer decisions.

That is, if an error occurs at the output of the TCM decoder, the error may cause series (or bursts) of errors, and for some period of time the number of decision errors in a feedback filter may be higher.

FIG. 9A shows an example relationship between the percentage of errors in the decision feedback filter and a time. In case of using the TCM feedback scheme shown in FIG. 7, the number of decision errors in the feedback filter may be smaller, but sometimes the TCM decoder may introduce bursts of errors and the number of decision errors may increase.

In case of using the slicer shown in FIG. 5, the percentage of decision errors may be more stable (e.g., approximately 20%). A higher percentage of decision errors may decrease the overall equalizer performance, but may stabilize the adaptation scheme because the LMS algorithm may not rely as much on the feedback mechanism.

When the TCM feedback mechanism is used, the feedback filter may be free of errors, and the LMS algorithm may update equalizer coefficients in accordance with this error-free state of the feedback filter. The equalizer may rely on feedback ISI compensation and may become more sensitive to decision errors. The TCM decoder may introduce bursts of errors and the equalizer performance may be degraded as shown in FIG. 8.

In the 'Stop-and-Go' LMS algorithm, the adaptive scheme implemented may disable adaptation when decisions may be less reliable.

SUMMARY OF THE INVENTION

Exemplary embodiments of the present invention provide a method of updating feedback coefficients of an equalizer (e.g., a decision feedback equalizer (DFE)) combined with a decoder (e.g., a trellis decoder), which may reduce negative effects of error propagation at the output of the decoder and may provide smoother and more stable steady-state operation of the equalizer combined with the decoder as compared with conventional adaptation methods.

An exemplary embodiment of the present invention provides an equalizer (e.g., a decision feedback equalizer). The equalizer may include a decoder and a filter. The filter may further include a plurality of filter update units, which may receive a value and decisions from the decoder and may update filter coefficients. The filter update units may further include a first multiplier, which may multiply a decision of the decoder by a value, a second multiplier, which may multiply the filter coefficient by a constant, and an adder, which may add the output of the first multiplier and the output of the second multiplier and update the filter coefficient.

Another exemplary embodiment of the present invention provides a method for updating filter coefficients. The method may include calculating output error signals, multiplying the output error signals by a parameter, obtaining a partial value, obtaining another partial value, and updating by adding the partial values.

Another exemplary embodiment of the present invention provides a filter. The filter may include updaters for updating filter coefficients. The filter updaters may include a first multiplier, a second multiplier, and an adder. The first multiplier may multiply a decision output from a decoder and a first value. The second multiplier may multiply a filter coefficient by a constant. The first adder may add an output of the first multiplier and an output of the second multiplier and may update a filter coefficient.

Another exemplary embodiment of the present invention provides an updater. The updater may include a first multiplier, which may multiply a decision and a first value and a second multiplier which may multiply a filter coefficient by a constant. A first adder may add an output of the first multiplier and an output of the second multiplier and update a filter coefficient.

Another exemplary embodiment of the present invention provides a logic selector. The logic selector may include squarers, which may square values of filter coefficients, multipliers, which may multiply squared filter coefficients generated by the squarers by constants, an adder, which may add outputs of the multipliers, an accumulator, which may accumulate an output of the adder, and a comparator, which may compare values output from the accumulator with threshold values and select constants based on the comparison.

Another exemplary embodiment of the present invention provides a method of updating a filter coefficient. The method may include multiplying a decision with a first value to generate a first result, multiplying a filter coefficient by a constant to generate a second result, adding the first and second results and updating a filter coefficient.

Another exemplary embodiment of the present invention provides a method of selecting a constant. The method may include squaring filter coefficient value, multiplying squared filter coefficients with constants, adding the multiplied values, accumulating the added values, comparing the accumulated values with threshold values and selecting constants based on the comparison.

In exemplary embodiments of the present invention, the decoder may be a trellis coded modulation (TCM) decoder.

In exemplary embodiments of the present invention, the equalizer may further include a second adder, which may subtract an output of the equalizer from the decision of the decoder and may generate an error signal. A third multiplier, which may multiply an error signal generated from the second adder by a parameter and may generate the first value.

In exemplary embodiments of the present invention, the parameter may be a stepsize parameter.

In exemplary embodiments of the present invention, the filter may further include a first and second group of cells, an updater, and an adder. The first group of cells may receive decisions output from the decoder and the outputs of the first multiplier. The second group of cells may receive values obtained by delaying a symbol decision of the decoder. The updater may update filter coefficients. The adder may add outputs from the first group of cells and the second group of cells. Further, each of the first and second groups of cells may include the updater and a coefficient multiplier, which may multiply the decision by the filter coefficient and may generate a result.

In exemplary embodiments of the present invention, the updater may update the filter coefficients in accordance with the equation $b_i^{(k+1)} = \alpha_i b_i^{(k)} + \mu e_k d_{k-i}$, i=1, 2, ..., $L_B$. $\alpha_i$ may be constants, which may be proportional to the reliability of the symbol decisions that correspond to an i-th traceback depth. $b_i^{(k)}$ may be i-th coefficients of the equalizer at a k-th iteration. LB may be a number of filter coefficients, $\hat{d}_k$ may be decisions in a filter, μ may be a parameter, and ek may be error signals.

In exemplary embodiments of the present invention, a logic selector may calculate a set of constants, which may satisfy the equation $\alpha_i = (1+\mu E[u_i^2])^{-1}$. $E[u_i^2]$ may be a variance of a plurality of symbol decision errors. The symbol decision errors may correspond to the i-th depth.

In exemplary embodiments of the present invention, the logic selector may be included in the filter.

In exemplary embodiments of the present invention, the coefficients may satisfy an inequality and i may be an i-th filter coefficient.

In exemplary embodiments of the present invention, the equalizer may include another filter and the decoder may be a Viterbi decoder.

In exemplary embodiments of the present invention, the decoder may have N+1 traceback depths, and the filter may include cells and an adder for adding the outputs from the cells. Each N+1th group of 12 reliability coefficients may have an N+1 th value, which may correspond to an N-th traceback depth. Each decision, which may correspond to an Nth traceback depth may be input to an N+1 th group of delay lines and each of the cells may include an updater and a coefficient multiplier for multiplying each decision by the filter coefficient and generate a result.

In exemplary embodiments of the present invention, the decoder may be a Viterbi decoder.

In exemplary embodiments of the present invention, the equalizer may further include a stop-and-go (SAG) unit. The SAG unit may receive decisions, detect unreliable decisions, and generate enable/disable signals of the algorithm such that the SAG unit may disable adaptation if the decisions are not reliable, and may update filter coefficients if the decisions are reliable.

In exemplary embodiments of the present invention, the method may be repeated for a plurality of filter coefficients.

In exemplary embodiments of the present invention, the method may further include determining a variance, multiplying the variance by a parameter, and obtaining a constant by taking the reciprocal of the sum of the result and 1.

In exemplary embodiments of the present invention, the method may further include squaring the filter coefficients, multiplying the squared values by constants, adding and accumulating the results, and comparing the accumulated values with threshold values to select a constant based on the comparison.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1:
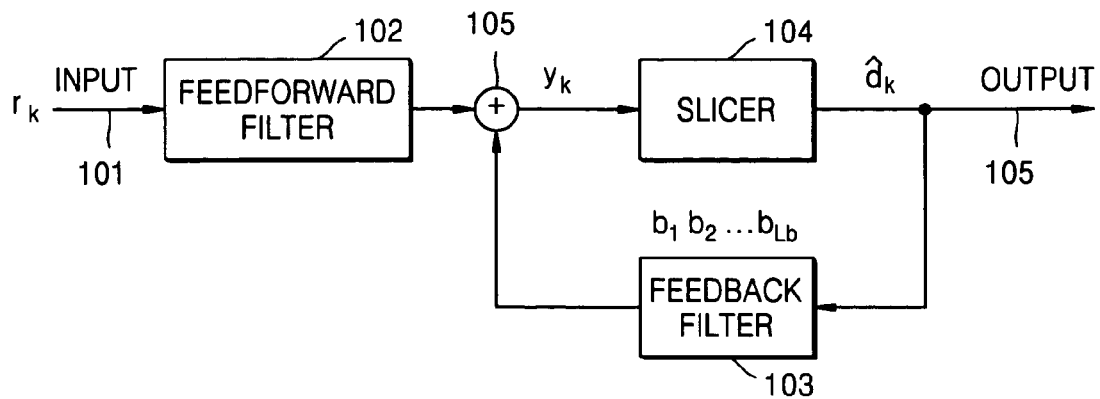
FIG. 1 is an example of a construction diagram of a conventional DFE.
Figure 2:
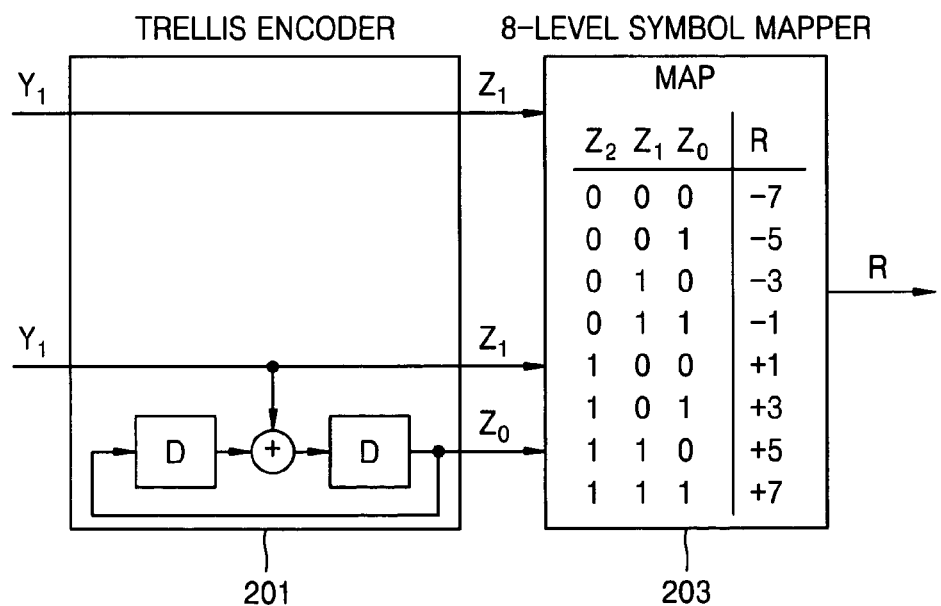
FIG. 2 illustrates a conventional TCM scheme for 8-level amplitude modulated signals.
Figure 3:
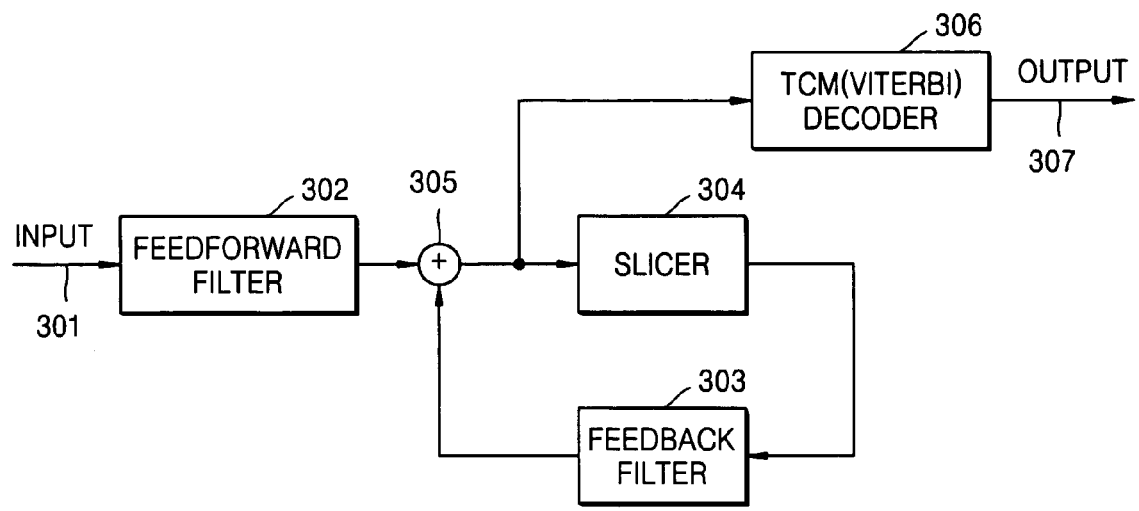
FIG. 3 is a construction diagram of a conventional DFE combined with a TCM decoder.
Figure 4:
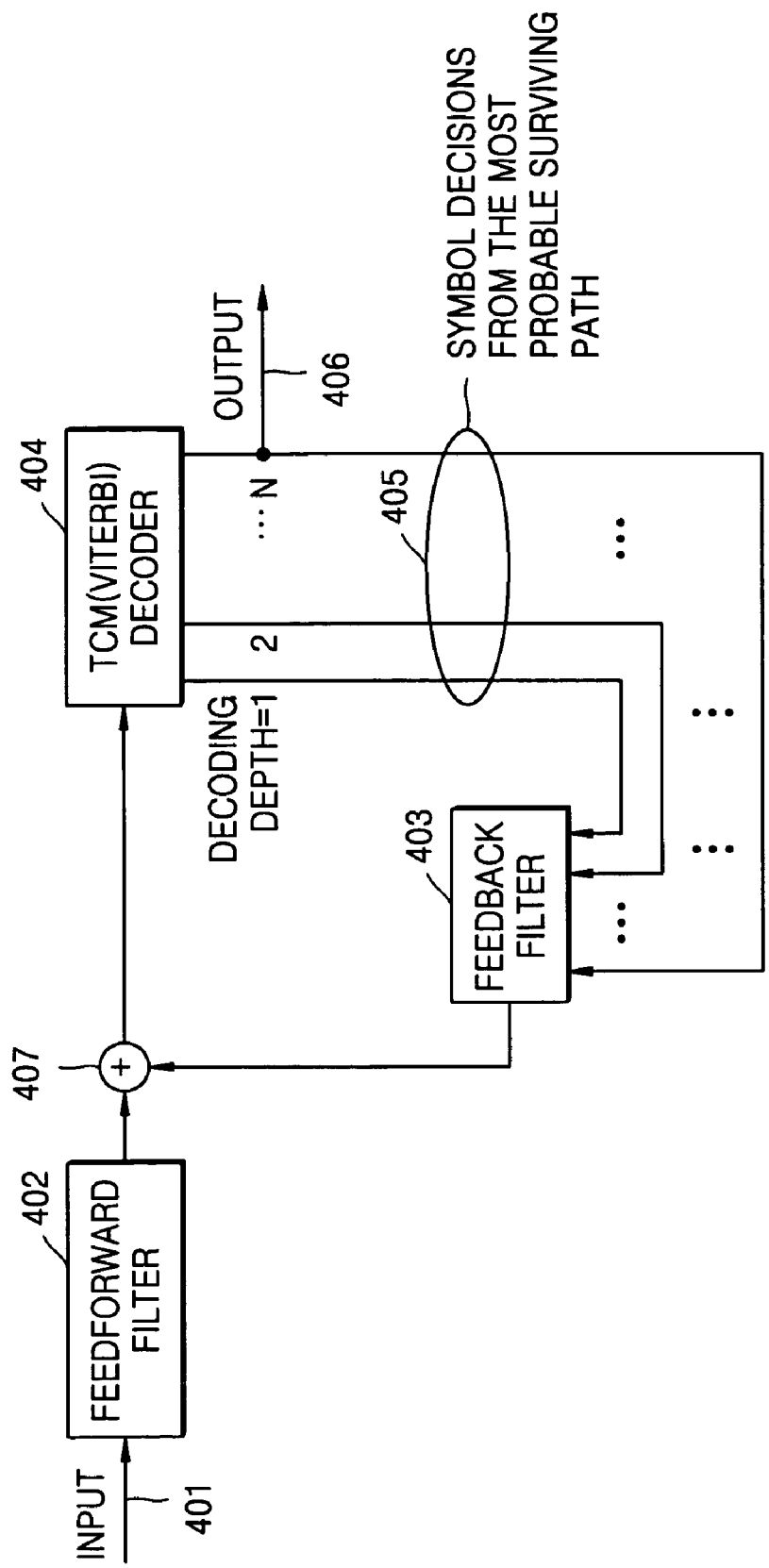
FIG. 4 is a construction diagram of another conventional DFE combined with a TCM decoder.
Figure 5:
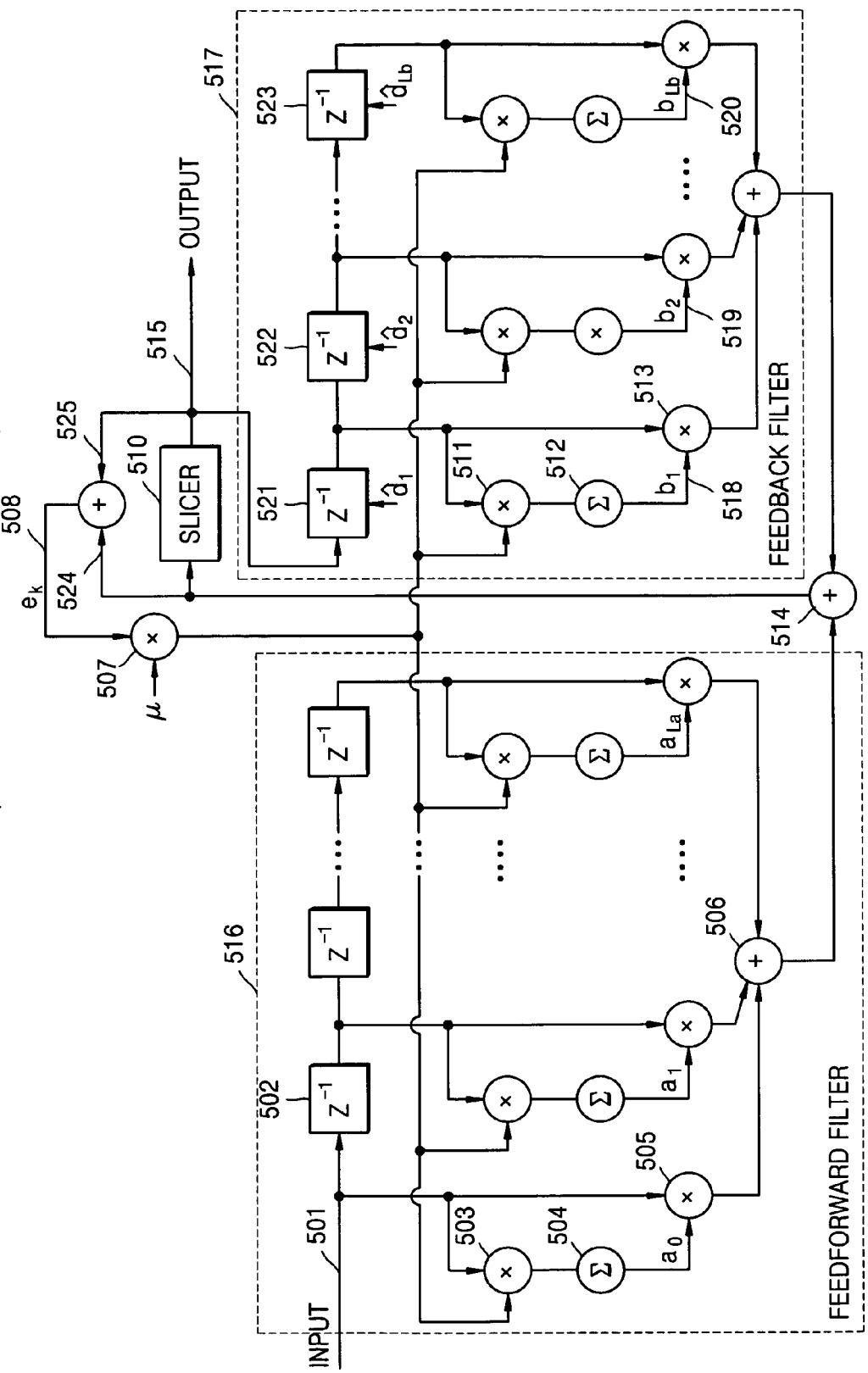
FIG. 5 is a construction diagram of a conventional DFE that uses LMS algorithm for updating feedback filter coefficients.
Figure 6:
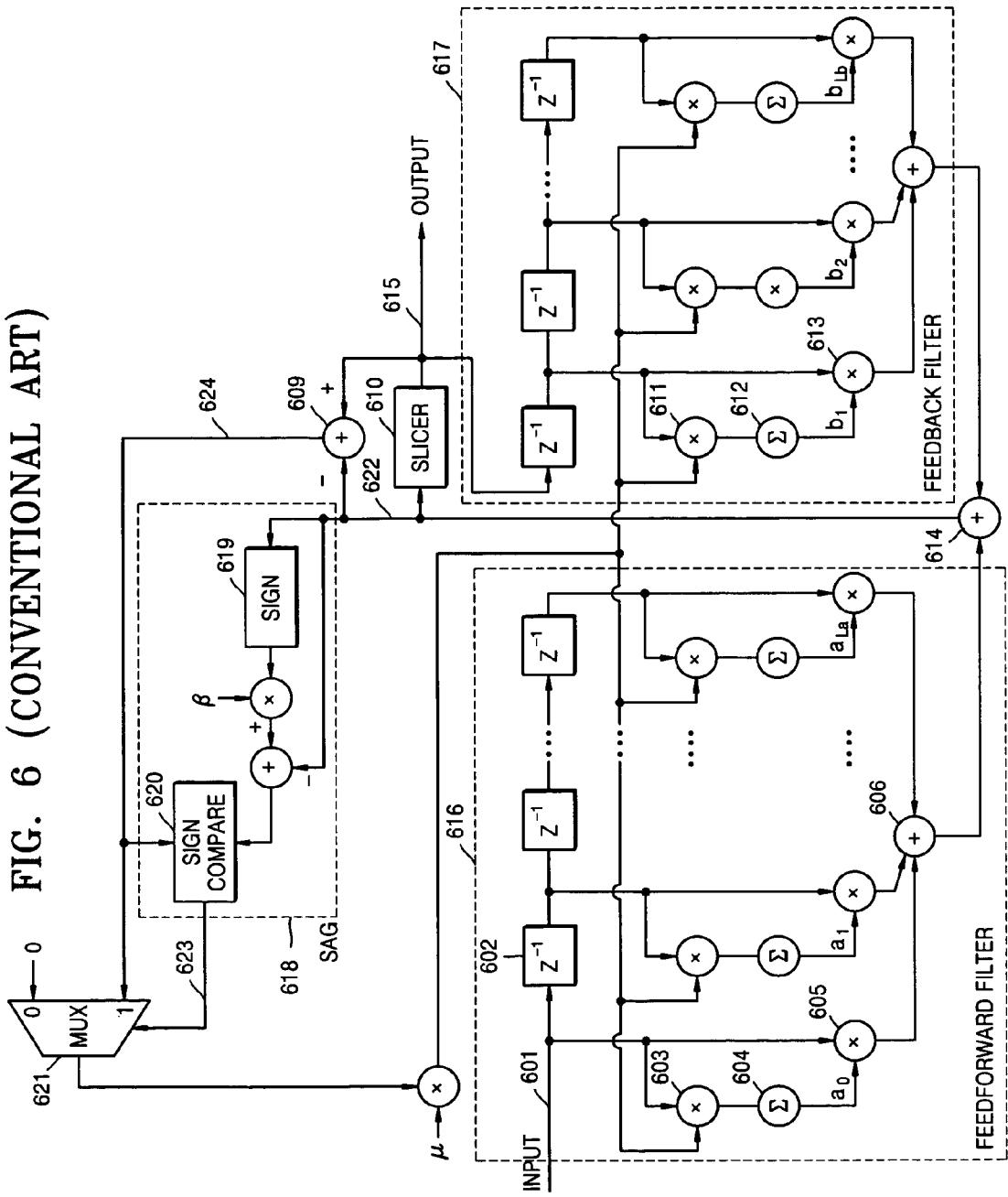
FIG. 6 is a construction diagram of a conventional DFE, which uses the LMS algorithm and a Stop-and-Go algorithm to update feedback filter coefficients.
Figure 7:
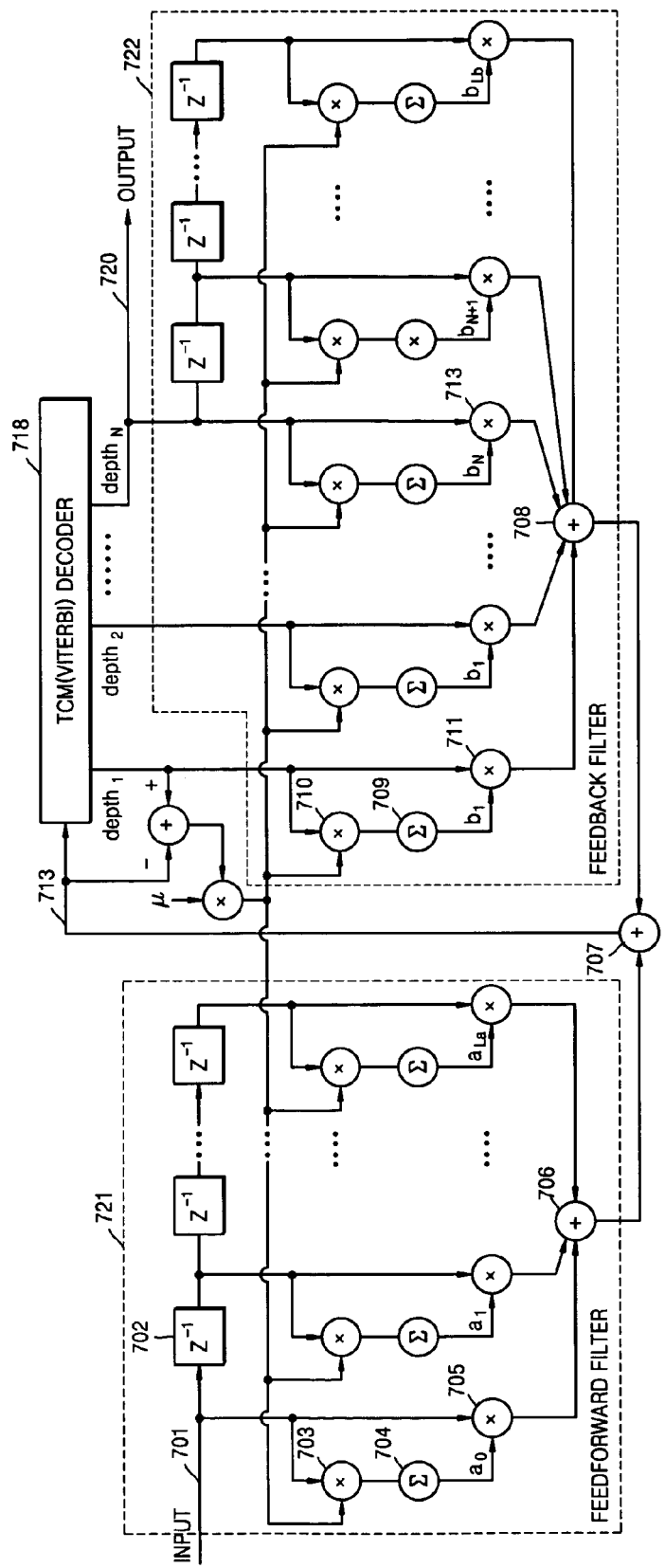
FIG. 7 is a construction diagram of a conventional DFE combined with a trellis decoder using LMS adaptation algorithm to update feedback filter coefficients.

Exemplary embodiments of the present invention will now be described more fully with reference to the accompanying drawings, in which exemplary embodiments of the present invention are shown. The same reference numerals are used to denote the same elements throughout the drawings.

Figure 9A:
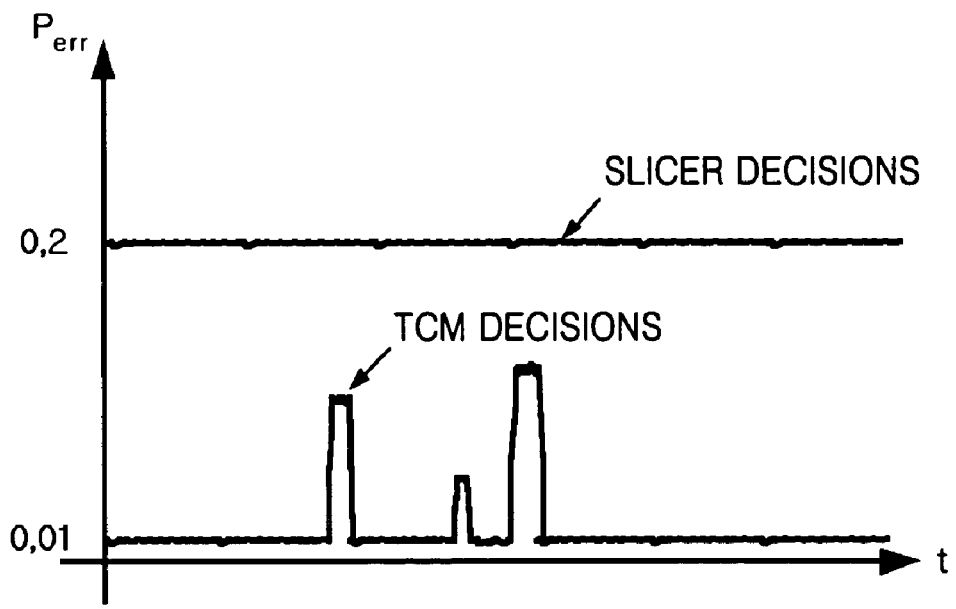
FIG. 9A is a graph showing the percentage of decision errors in the slicer and the TCM decoder as a function of time.
Figure 9B:
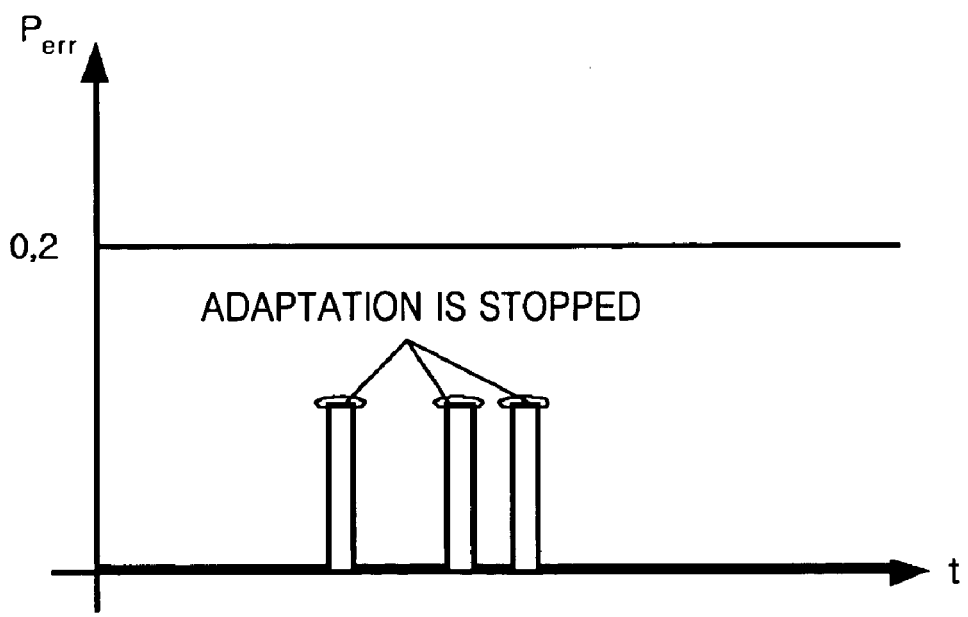
FIG. 9B is a simplified model of the graph shown in FIG. 9A, which is used to enable stable adaptation algorithm according to an exemplary embodiment of the present invention.

FIG. 9B is a simplified model of the graph shown in FIG. 9A, which may enable a stable adaptation algorithm according to exemplary embodiments of the present invention.

Figure 8:
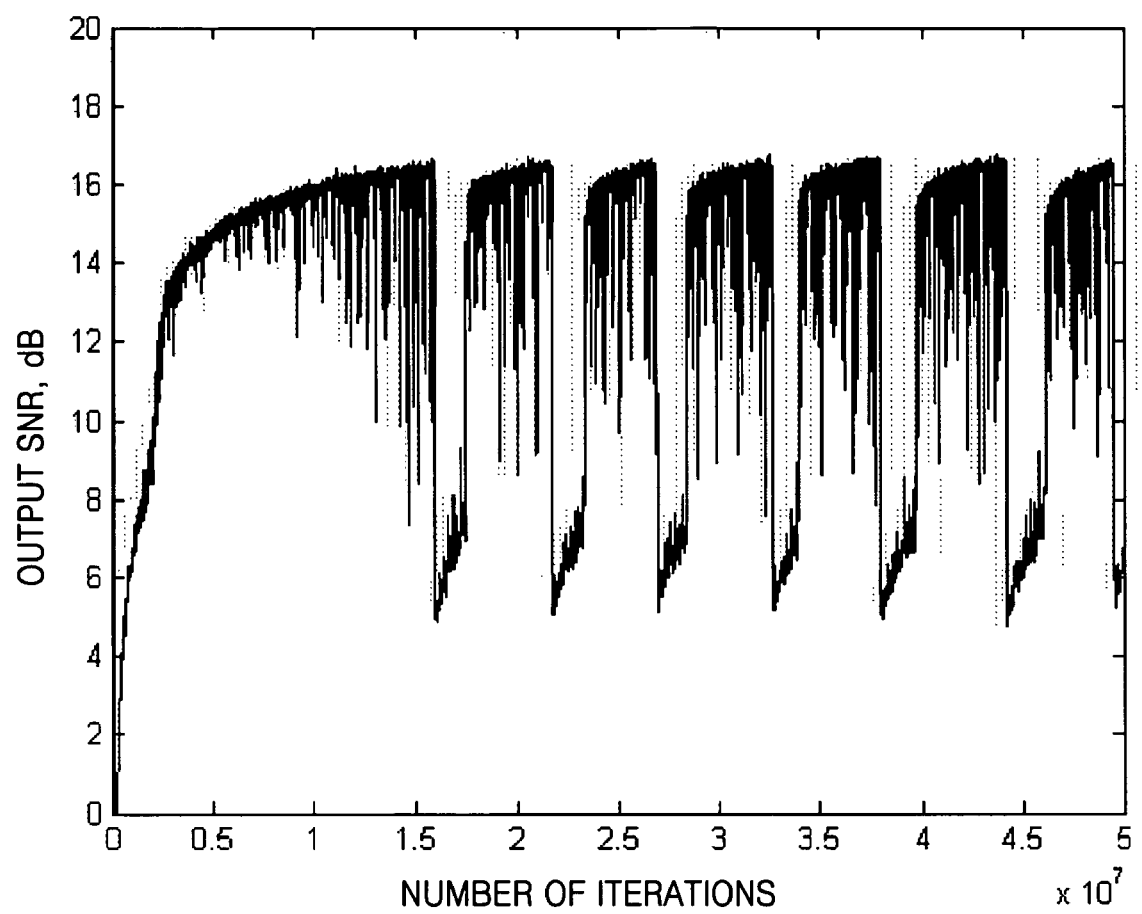
FIG. 8 is a graph showing the signal-to-noise ratio (SNR) versus the number of iterations for the DFE shown in FIG. 7.

Adaptation may be performed using decisions in a feedback filter as shown in FIG. 9B, which may have less frequent errors (e.g., may be error-free). The algorithm may operate with reduced errors (e.g., mean-square errors (MSE)), when the feedback filter includes decision errors (e.g., during error bursts), in order to reduce SNR degradation as shown in FIG. 8.

The development of the stable adaptation algorithm may be based on the above-described model and adaptive filtering. An improved algorithm may reduce the cost function as illustrated in equation 2.

$$J = E\lfloor (y_k - d_k)^2 \rfloor \quad (2)$$

$y_k$ may be an output signal of an adder 707 of an equalizer 713 (e.g., a decision feedback equalizer (DFE)), i.e., the sum of the output signal of the filter (e.g., feedforward filter) 721 and the output signal of the filter (e.g., feedback filter) 722, and $d_k$ may be error-reduced transmitted symbols (e.g., error-free transmitted signals). Reduction of the function (2), which may be a cost function, may lead to a modified LMS algorithm shown in Equation 3.

$$b_i^{(k+1)} = \alpha_i b_i^{(k)} + \mu e_k d_{k-i}, (i=1, 2, \ldots L_B) \quad (3)$$

$\alpha_i$ may be constants ($0 < \alpha_i < 1$), which may be proportional to the reliability of the decoder (e.g., TCM decoder) symbol decisions, which may correspond to i-th traceback depth. As values i increase, decisions at the output of a TCM decoder may be more reliable and the values $\alpha_i$ may be closer to 1. As values i decrease, the decisions may be less reliable and the values $\alpha_i$ may be smaller, for example, $\alpha_1 \leq \alpha_2 \leq \ldots \leq \alpha_{L_B}$. Values of $\alpha_i$ may be based on a step-size parameter $\mu$. The values $\alpha_i$ may be represented as shown in Equation 4.

$$\alpha_i = (1 + \mu E\lfloor u_i^2 \rfloor)^{-1} \quad (4)$$

$E\lfloor u_i^2 \rfloor$ may be a variance of the decoder (e.g., TCM decoder) symbol decision errors, which may correspond to the i-th depth. The values $E\lfloor u_i^2 \rfloor$ may be found by, for example, simulations or calculations (e.g., theoretical calculations). For example, values $E\lfloor u_i^2 \rfloor$ for a decoder and three-path equal amplitude channel model are given in Table 1.

TABLE 1

| Depth (i) | $E[u_i^2]$ |
| --- | --- |
| 0 | 0.17 |
| 1 | 0.16 |
| 2 | 0.13 |
| 3 | 0.11 |
| 4 | 0.09 |
| 5-9 | 0.08 |
| $\geq 10$ | 0.05 |

Figure 10A:
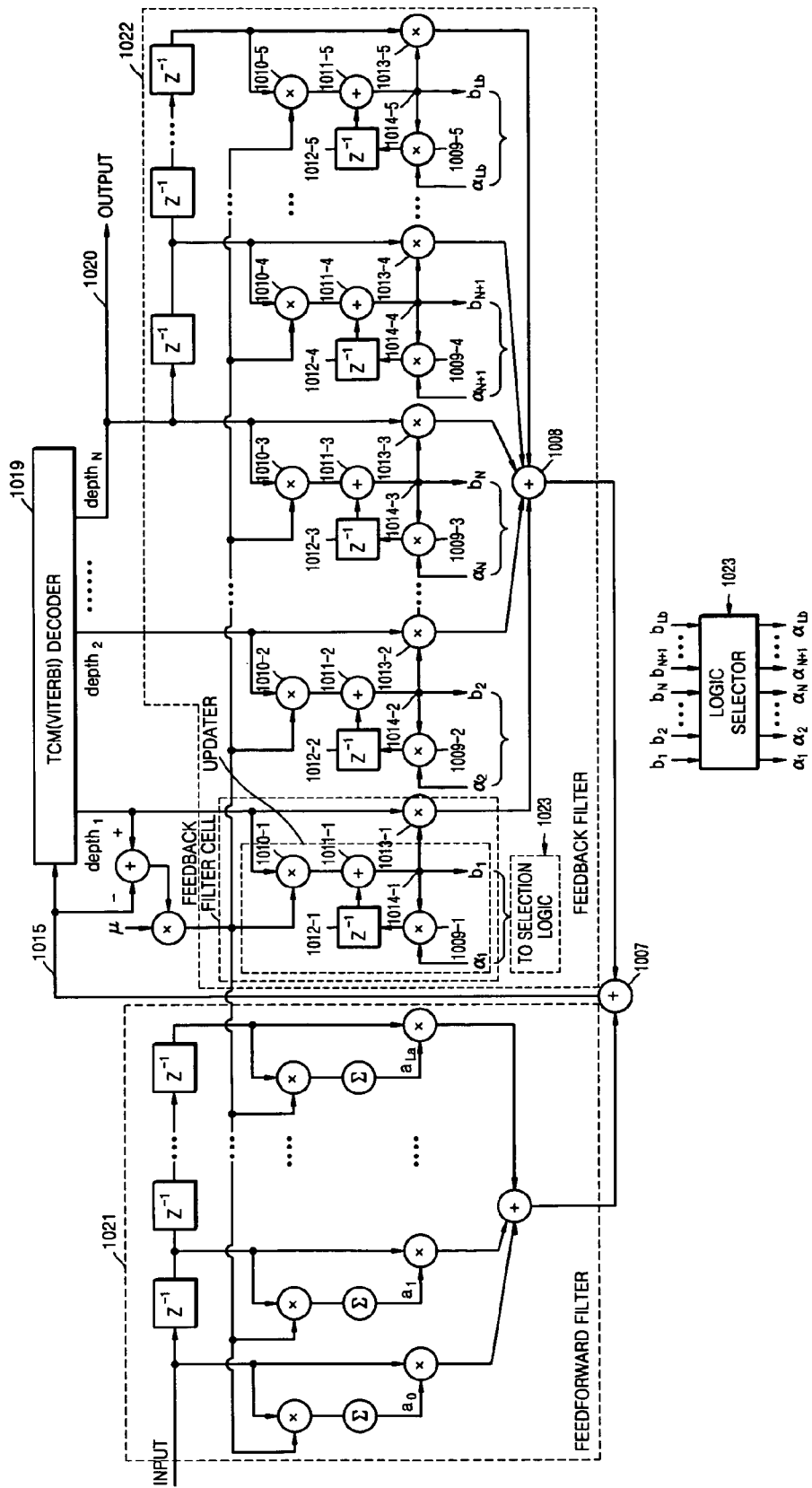
FIG. 10A is a construction diagram of an equalizer combined with a decoder, which may update filter coefficients according to exemplary embodiments of the present invention.

FIG. 10A is an example of a construction diagram of an equalizer (e.g., a DFE), which may be combined with a trellis decoder, which may update feedback filter coefficients according to exemplary embodiments of the present invention.

The structure of a decoder (e.g., an adaptive TCM decoder) combined with an equalizer (e.g., a DFE), which may that use the algorithm shown in Equation 3 is illustrated in FIG. 1A. Referring to FIG. 10A, the equalizer may include a filter (e.g., a feedforward filter) 1021, a filter (e.g., a feedback filter) 1022, an adder 1007, and the decoder (e.g., a TCM decoder) 1019. In the equalizer shown in FIG. 10A, updating of the filter coefficients (e.g., feedback filter coefficients) in Equation 3 may be performed by multipliers 1010_1 through 1010_5, adders 1011_1 through 1011_5, delay lines 1012_1 through 1012_5, and multipliers 1009_1 through 1009_5. The delay lines 1012_1 through 1012_5 may store the filter coefficient value $b_i^{(k)}$ and may calculate the filter coefficient value $b_i^{(k+1)}$.

The filter 1022 may include a plurality of filter cells (e.g., feedback filter cells) and an adder. The filter 1022 may include a first group of cells, a second group of cells, an adder 1008, and a logic selector 1023. The first group of cells may receive decisions output from the decoder 1019 and output signals from a first multiplier. Each of the cells of the second group may receive a value which may be obtained by delaying a symbol decision (e.g., a last symbol decision) of the decoder 1019 and the output signal of the first multiplier. Each of the cells of the second group may include an updater (e.g., a feedback filter coefficient updater), which may update filter coefficients (e.g., feedback filter coefficients). The adder 1008 may add the outputs of the first and second groups of cells. The logic selector 1023 may calculate constants from the filter coefficients.

The cells of the first and second groups may include the updater and a coefficient multiplier 1013_$i$, which may multiply the decisions and the filter coefficients and may output the results.

Referring to FIG. 10A, $b_i^{(k)}$ ($i=1, 2, \ldots, L_B$) may be i-th feedback coefficients of the equalizer at k-th iteration, $L_B$ may be the number of filter coefficients, $d_k$ may be the decisions in the filter 1022, which may be stored in delay lines 1012_1 through 1012_5, $\mu$ may be a smaller step-size parameter (e.g., positive constant), and $e_k$ may be error signals 508, which may be differences between the outputs 1015 of the equalizer and the decisions $d_k$.

Figure 10B:
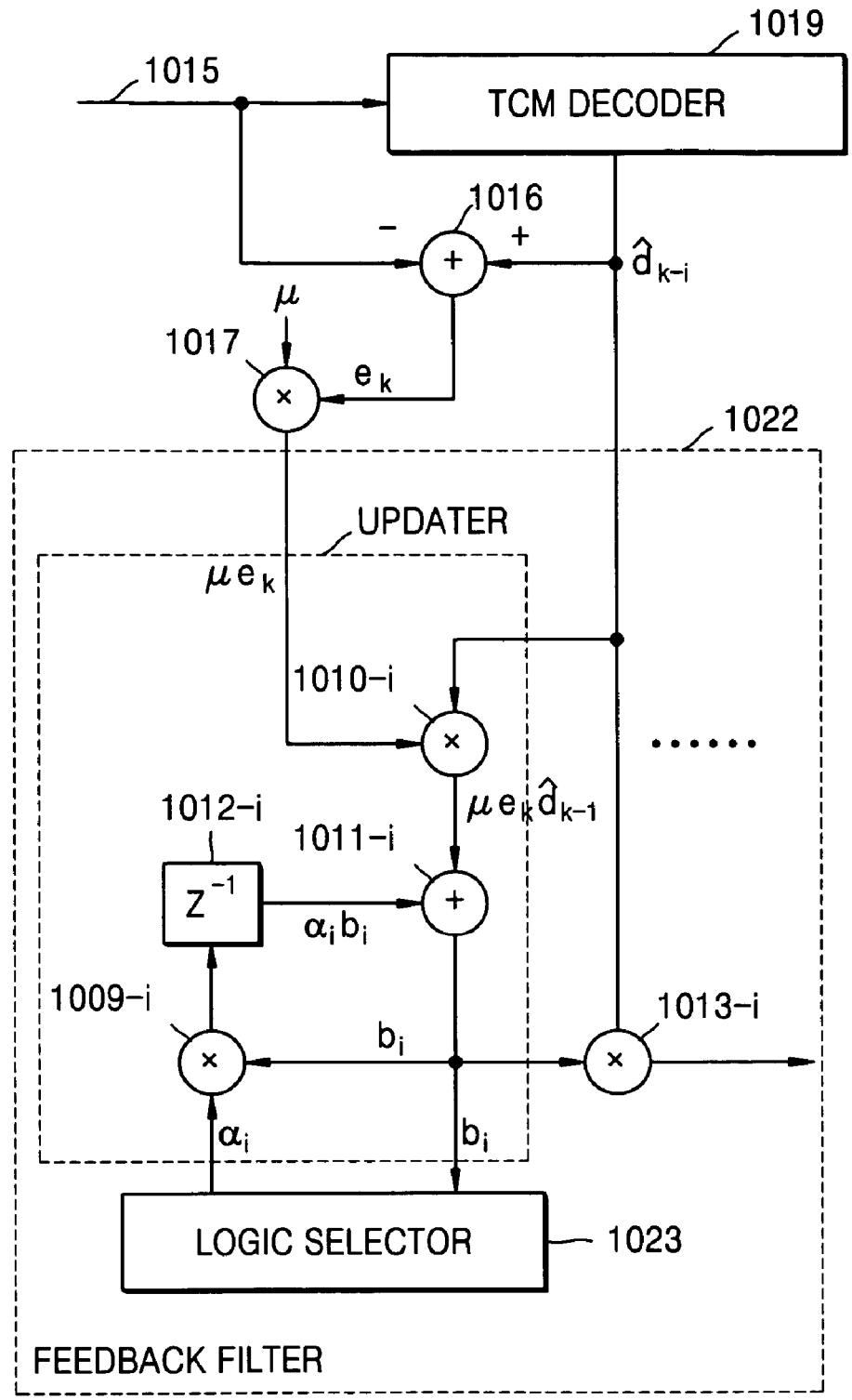
FIG. 10B is an exemplary embodiment of a circuit diagram of a partial circuit of updating an i-th feedback coefficient shown in FIG. 10A.

FIG. 10B is an example of a circuit diagram of a partial circuit of updating i-th feedback coefficients shown in FIG. 10A, according to an exemplary embodiment of the present invention.

Referring to FIG. 10B, an adder 1016 may generate an error signal $e_k$, which may be a difference between the output 1015 of the equalizer and the decision $d_k$. A multiplier 1017 may multiply the error signal $e_k$ by the step-size parameter $\mu$. The multiplier 1010_$i$ may multiply the result by the decision $d_k$ and may generate $\mu e_k d_{k-i}$. The multiplier 1009-$i$ may multiply the constant $\alpha_i$ and the i-th feedback filter coefficient $b_i^{(k)}$ of the equalizer at the k-th iteration. The adder 1011_$i$ may add the output of the delay line 1012_$i$ and the output of the multiplier 1010_$i$ and may generate an i-th feedback filter coefficient $b_i^{(k+1)}$, which may correspond to the next (k+1) iteration of the equalizer.

As described above, $\alpha_i$ may be decision constants ($0<\alpha_i<1$), which may be proportional to the reliability of decoder symbol decisions, which may correspond to the i-th traceback depth. The decision constants $\alpha_i$ may be calculated by the logic selector 1023 shown in FIGS. 10A and 10B.

The constants ($0<\alpha_1 \leq \alpha_2 \leq \ldots \leq \alpha_{L_B} \leq 1$) may be based on a channel profile (e.g., a multipath channel profile). For example, if a channel has several stronger ghosts which may not be compensated by the filter 1021, the equalizer may become increasingly sensitive to the reliability of decisions in the filter 1022. In order to decrease equalizer instability, smaller values may be assigned to the constants $\alpha_i$. If a channel does not introduce, for example, isolated strange ghosts, the equalizer may not exhibit an instability problem, and smaller values of $\alpha_i$ may, for example, degrade equalizer performance.

This degradation may be insignificant and constants $\alpha_1$, $\alpha_2, \ldots, \alpha_{LB}$ may be selected as a trade-off between performance in stronger ghost channels and weaker ghost channels. The set of constants $\alpha_1, \alpha_2, \ldots, \alpha_{LB}$ may be selected (e.g., adaptively selected) in accordance with channel statistics and may improve the performance of the equalizer.

Figure 10C:
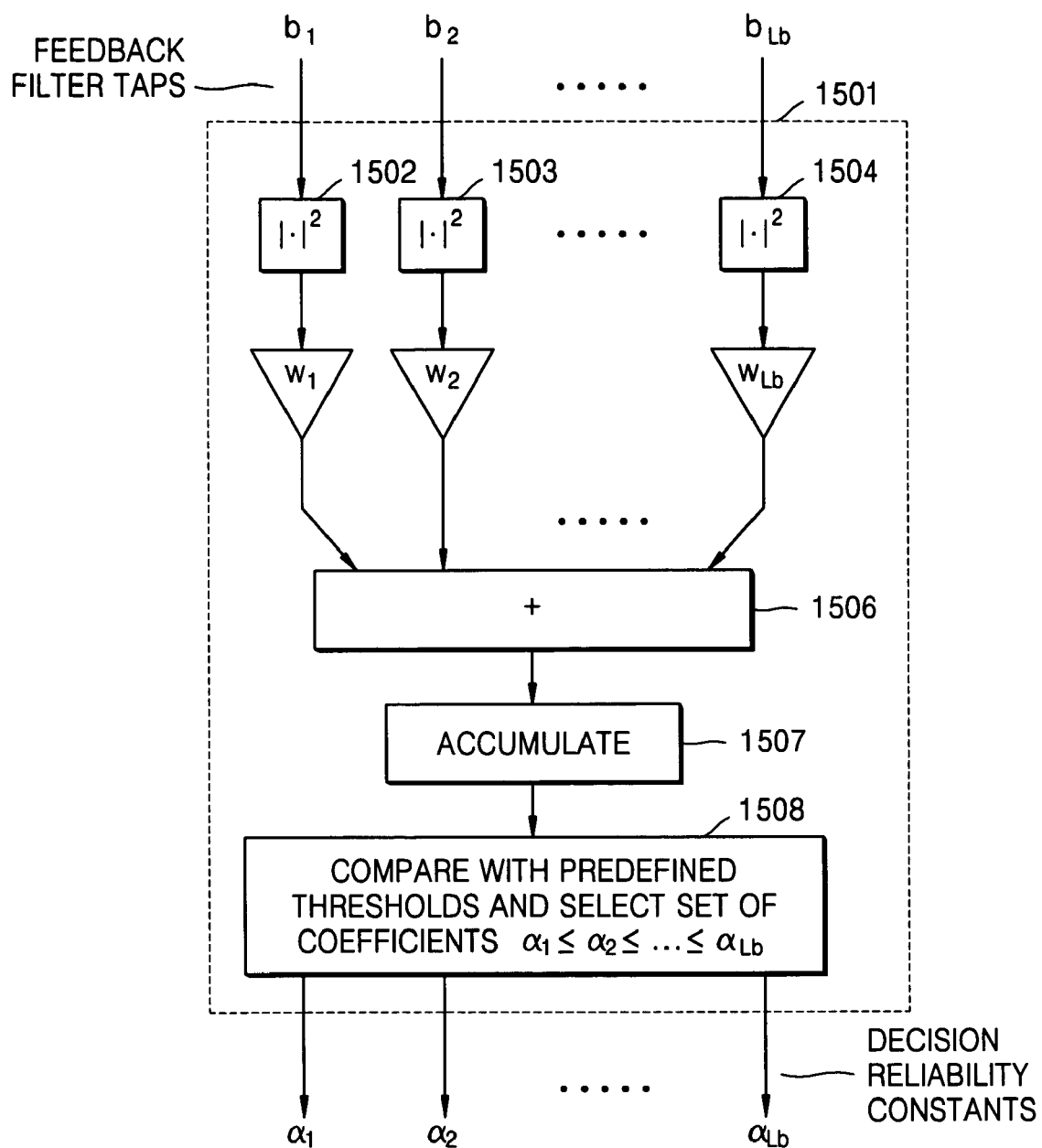
FIG. 10C is a example of a construction diagram of an exemplary embodiment of the logic selector.

FIG. 10C is an example of a construction diagram of a logic selector, which may select a set (e.g., an optimal set) of constants (e.g., reliability constants).

As illustrated in FIG. 10C, squared values (e.g., squared absolute values) of filter (e.g., feedback filter) coefficients $b_1$, $b_2, \ldots, b_{L_B}$ may be calculated in squarers (e.g., absolute value squarers) 1502, 1503, ... 1504. Values $|1_1|^2, |b_2|^2, \ldots, |b_{L_B}|^2$ of the squared coefficients may be multiplied by weighted coefficients $w_1, w_2, \ldots, w_{L_B}$ in a multiplier 1505 such that $w_1 \geq w_2 \geq \ldots \geq w_{L_B}$. The multiplied values may be summed together in an adder 1506.

The added values may be accumulated in an accumulator 1507 and noise effects may be reduced. The accumulation time may be, for example, several hundreds of symbols. The accumulated values may be compared with several threshold values in a comparator 1508 and a set of constants $\alpha_1$, $\alpha_2, \ldots, \alpha_{L_B}$ may be selected based on the result of this comparison.

Figure 11:
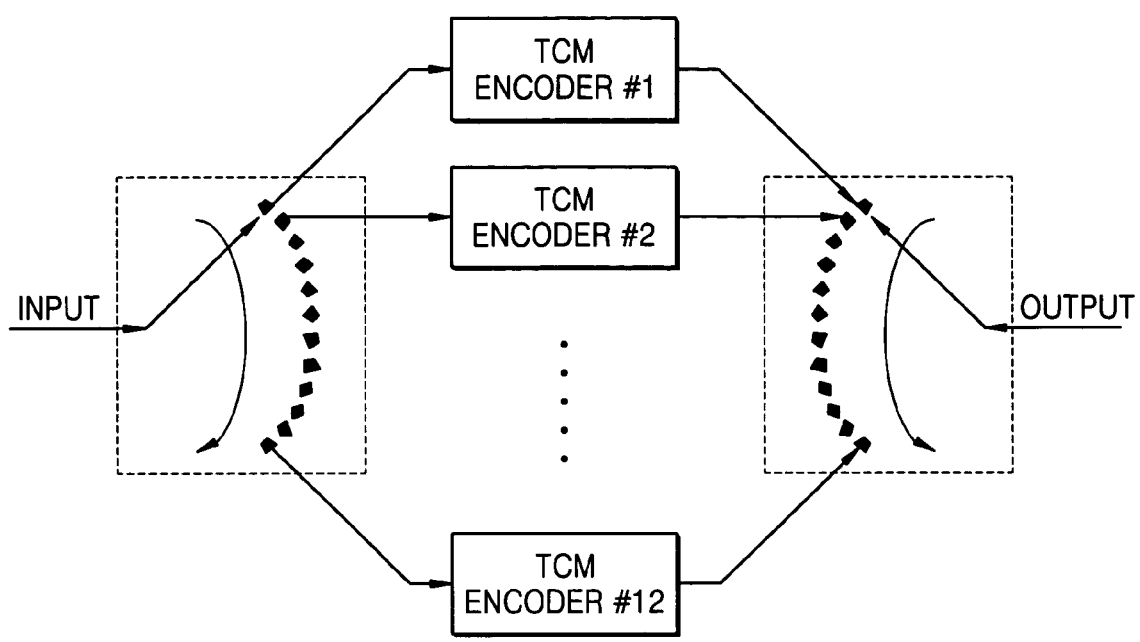
FIG. 11 is an example construction diagram of an encoder with an interleaver according to an exemplary embodiment of the present invention.

FIG. 11 is an example of a construction diagram of an encoder (e.g., a TCM encoder) and an interleaver.

An adaptation algorithm according to exemplary embodiment of the present invention may be applied to systems, which may employ multiple encoders (e.g., TCM encoders) and/or interleavers, for example, an 8-VSB trellis-coded system, which may be used for, for example, digital video broadcasting. Such systems may use a plurality of encoders (e.g., identical TCM encoders). An example construction of these encoders, according to an exemplary embodiment of the present invention is illustrated in FIG. 11.

Referring to FIG. 11, an broadcasting system (e.g., an 8-VSB broadcasting system) may include 12 encoders (e.g., parallel TCM encoders), and code interleaving may be achieved by encoding (e.g., TCM encoding) of, for example, the 1st, 13th, 25th ..., symbols as a first group, the 2nd, 14th, 26th, . . . , symbols as a second group, the 3rd, 15th, 27th, . . . , symbols as a third group, etc., resulting in, for example, a total of 12 groups.

Figure 12:
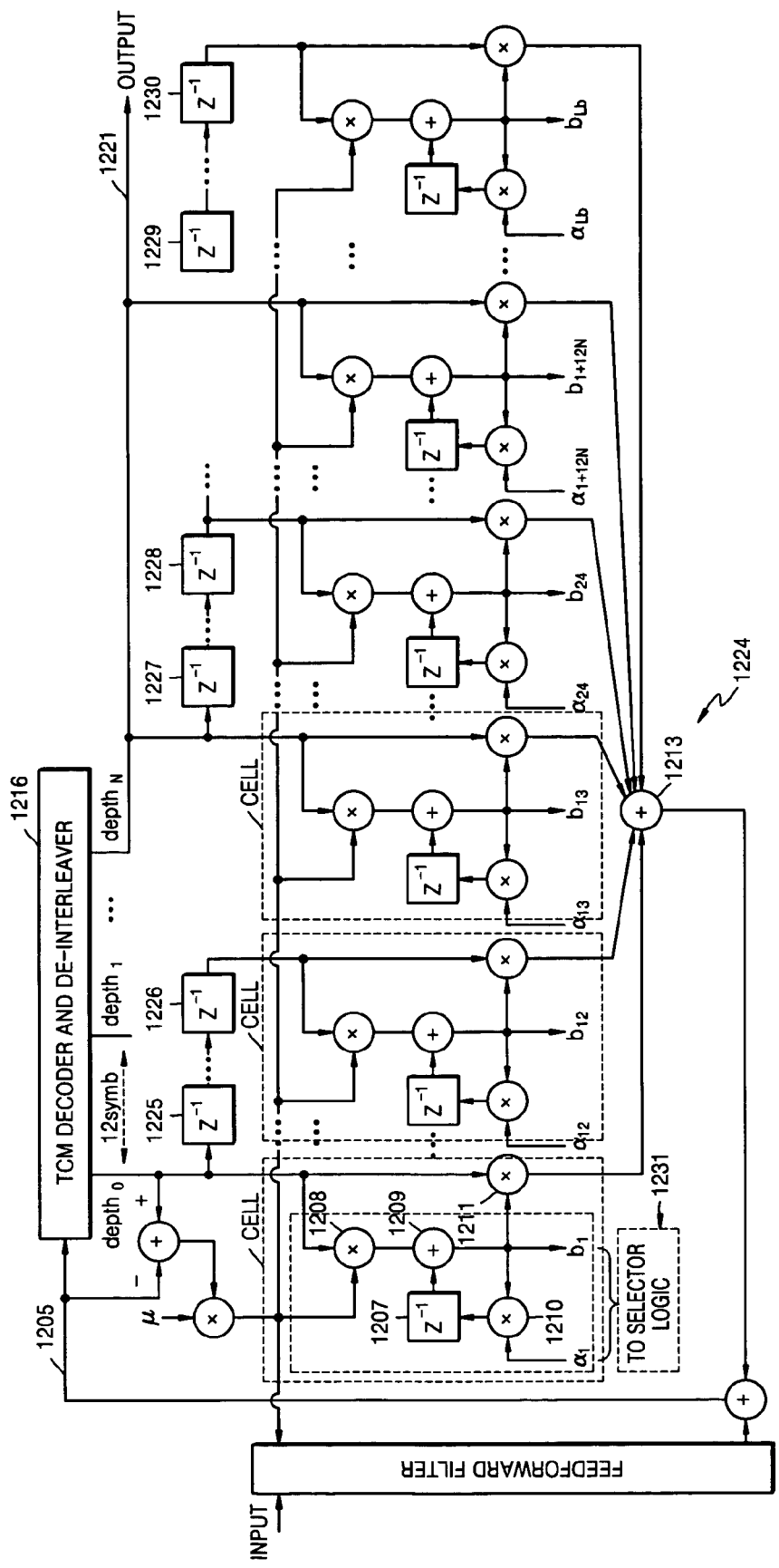
FIG. 12 illustrates another exemplary embodiment of a decoder combined with an equalizer, which may be used with a de-interleaver.

FIG. 12 illustrates another adaptive decoder (e.g., TCM decoder) combined with an equalizer (e.g., a DFE), which may include a de-interleaver.

A filter (e.g., a feedback filter) 1224 of an equalizer (e.g., a DFE) according to another exemplary embodiment of the present invention illustrated in FIG. 12, may include a plurality of groups of cells, an adder 1213 and a logic selector 1231. Each group of cells may include, for example, 12 cells. The adder 1213 may add the outputs of the cells and a logic selector 1231 may calculate constants (e.g., reliability constants).

The cells of the groups may receive values which may be obtained by delaying (e.g., sequentially delaying) decisions at the output of a decoder (e.g., a TCM decoder) 1216 and error signals of the equalizer, which may be multiplied by a step-size parameter $\mu$. Each of the cells of the groups may include an updater, which may update the filters (e.g., feedback filters). The cells of the groups may also include a multiplier 1211, which may multiply filter coefficients (e.g., feedback filter coefficients by input decisions.

An updater (e.g., feedback filter updater) may include a multiplier 1208, a multiplier 1210, a delayer 1207, and an adder 1209. The multiplier 1208 may multiply decisions by error signals, which may be multiplied by a parameter. The multiplier 1210 may multiply feedback filter coefficients $b_i$ by constants $\alpha_i$. The delayer 1207 may delay the outputs of the multiplier 1210. The adder 1209 may add the outputs of the delayer 1207 and the outputs of the multiplier 1208 and may generate filter coefficients (e.g., feedback filter coefficients).

Referring to FIG. 12, the adaptation algorithm of the decoder (e.g., the TCM decoder), which may be combined with the equalizer (e.g., a DFE) illustrated in FIG. 12, may be the same, or substantially the same, as that as has been described with respect to FIG. 10A. With regard to FIG. 12, a first group of constants $\alpha_1, \alpha_2, \ldots, \alpha_{12}$ may have the same, or substantially the same, first value, which may correspond to the 0th traceback depth (see table 1), a second group of constants $\alpha_{13}, \alpha_{14}, \ldots, \alpha_{24}$ may have the same, or substantially the same, second value, which may correspond to the 1st traceback depth, a third group of constants $\alpha_{25}, \alpha_{26}, \ldots, \alpha_{36}$ may have the same, or substantially the same, third value, which may correspond to the 2nd traceback depth, . . . , and an N+1th group of, for example, 12 constants may have the same, or substantially the same, N+1 th value, which may correspond to the N-th traceback depth. Decisions, which may correspond to the 0th traceback depth, may be input to a first group of delay lines 1225 . . . 1226, decisions, which may correspond to the 1st traceback depth may be input to a second group of delay lines 1227 . . . 1228, . . . , and decisions, which may correspond to the N-th traceback depth may be input to an N+1 th group of delay lines 1229 . . . 1230.

Figure 13:
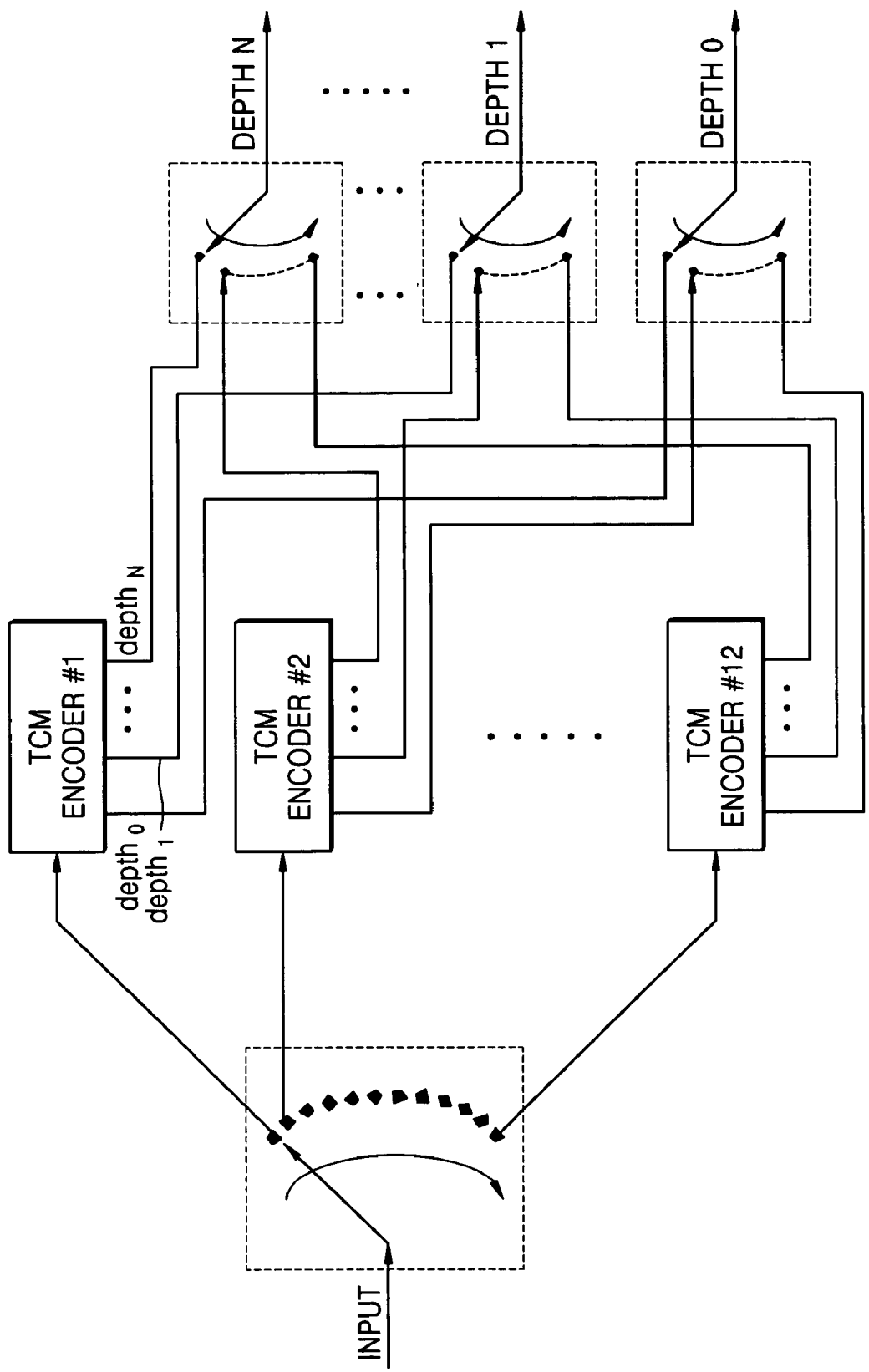
FIG. 13 is another example construction diagram of the decoder, which may be combined with the de-interleaver shown in FIG. 12, according to an exemplary embodiment of the present invention.

FIG. 13 is an example of a construction diagram of the decoder (e.g., a TCM decoder) combined with the de-interleaver 1216, according to an exemplary embodiment of the present invention.

Figure 14:
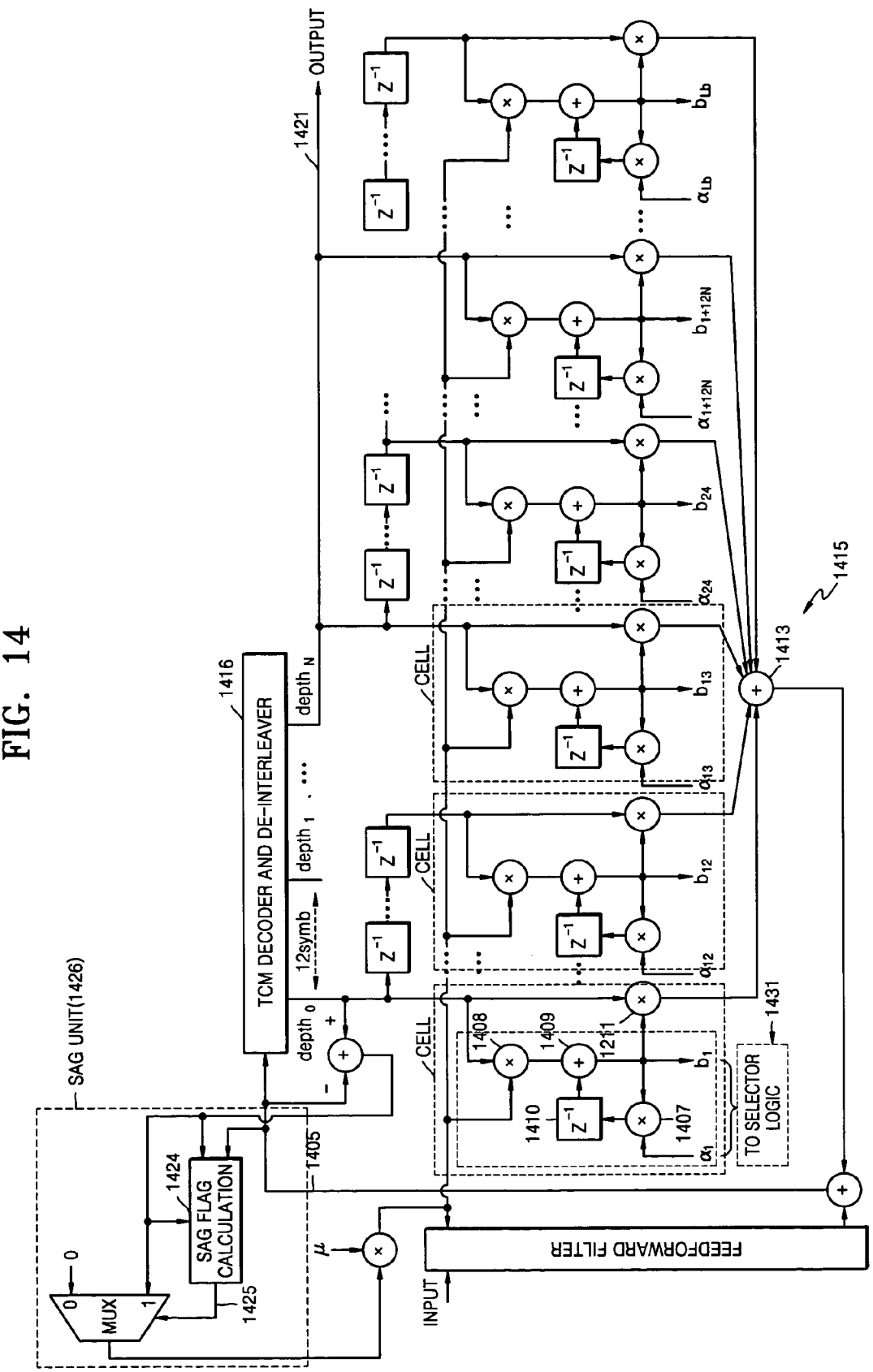
FIG. 14 is an example construction diagram of an equalizer, which may be combined with a decoder, according to exemplary embodiments of the present invention.

FIG. 14 is an example of a construction diagram of an equalizer (e.g., a DFE), which may be combined with a decoder (e.g., a trellis decoder). The equalizer may use the algorithm according to exemplary embodiments of the present invention and the "Stop-and-Go" algorithm to update filter coefficients (e.g., feedback filter coefficients).

In another exemplary embodiment of the present invention, the adaptation algorithm may be performed in a 'Stop-and-Go' mode as shown in FIG. 14. Referring to FIG. 14, a Stop-and-Go unit 1424 may generate a flag 1425, which may disable updating of the equalizer coefficients if the decoder (e.g., TCM decoder) decisions are not reliable.

In the equalizer (e.g., the DFE) shown in FIG. 14, a filter (e.g., a feedback filter) 1415 may include a plurality of groups of cells, an adder 1413, and a logic selector 1431. Each group may be comprised of, for example, 12 cells. The adder 1413 may add the outputs of the cells and a logic selector 1431 may calculate constants (e.g., reliability constants).

The cells of the groups may receive values, which may be obtained by delaying (e.g., sequentially delaying) the decisions at the output of the decoder (e.g., TCM decoder) 1416 and error signals, which may be multiplied by a step-size parameter μ. Each of the cells of the groups may include an updater, which may update filters (e.g., feedback filters), and a multiplier 1411, which may multiply filter coefficients (e.g., feedback filter coefficients) by input decisions.

An updater (e.g., a feedback filter updater) may include a multiplier 1408, a multiplier 1410, a delayer 1407, and an adder 1409. The multiplier 1408 may multiply decisions by error signals, which may be multiplied by a parameter. The multiplier 1410 may multiply filter coefficients (e.g., feedback filter coefficients) $b_i$ by constants $\alpha_i$. The delayer 1407 may delay the outputs of the multiplier 1410. The adder 1409 may add the outputs of the delayer 1407 and the outputs of the multiplier 1408 and may generate filter coefficients (e.g., feedback filter coefficients).

Referring to FIG. 14, the adaptation algorithm of the decoder (e.g., TCM decoder) may be combined with the equalizer (e.g., DFE) shown in FIG. 14 may be the same, or substantially the same, as the algorithm as discussed above with regard to FIG. 12. A first group of constants $\alpha_1$, $\alpha_2, \ldots, \alpha_{12}$ may have the same, or substantially the same, first value, which may correspond to the 0th traceback depth (see table 1), a second group of constants $\alpha_{13}, \alpha_{14}, \ldots, \alpha_{24}$ may have the same, or substantially the same, second value, which may correspond to the 1st traceback depth, a third group of constants $\alpha_{25}, \alpha_{26}, \ldots, \alpha_{36}$ may have the same, or substantially the same, third value, which may correspond to the 2nd traceback depth, . . . , and an N+1th group of 12 constants may have the same, or substantially the same, N+1th value, which may correspond to the N-th traceback depth. Decisions, which may correspond to the 0th traceback depth, may be input to a group of, for example, delay lines 1225 . . . 1226, decisions, which may correspond to the 1st traceback depth, may be input to a second group of, for example, delay lines 1227 . . . 1228, . . . , and decisions which may correspond to the N-th traceback depth may be input to a group of, for example, delay lines 1229 . . . 1230.

The equalizer (e.g., the DFE) shown in FIG. 14 may further include a Stop-and-Go (SAG) unit 1426.

The SAG unit 1426 may receive decisions, may detect less reliable decisions, and may generate enable/disable signal. The SAG unit 1426 may disable adaptation if the decisions are less reliable, and may update equalizer coefficients if the decisions are more likely to be correct.

Figure 15:
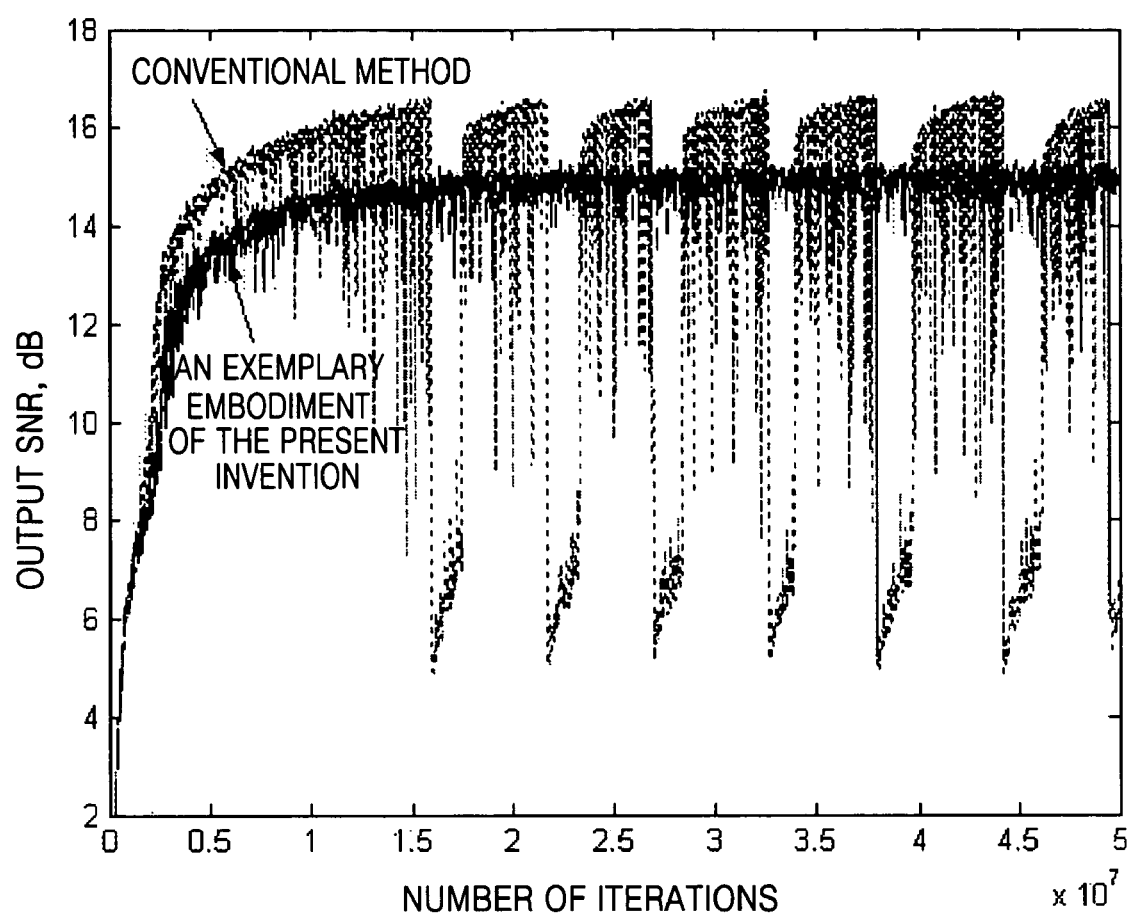
FIG. 15 is an example graph showing a comparison of the output signal-to-noise ratio (SNR) versus the number of iterations for an equalizer combined with a decoder, which may use a conventional (LMS) algorithm and the method according to exemplary embodiments of the present invention.

An example of a result of using the adaptation algorithm, according to the exemplary embodiments of the present invention, is illustrated in FIG. 15.

FIG. 15 is a graph showing an example of a comparison of the output signal-to-noise ratio (SNR) versus the number of iterations for an equalizer (e.g., a DFE), which may be combined with a decoder (e.g., a trellis decoder).

As illustrated in FIG. 15, the operation of the equalizer (e.g., DFE) may be smoother and improved when using the algorithm according to exemplary embodiments of the present invention.

Various modifications may be made to circuits using the adaptation algorithm according to exemplary embodiments of the present invention. For example, decoder (e.g., TCM decoder) decisions, which may correspond to the depth N, may be used to generate error signals ek and drive the adaptation process. Any number of interleaved encoders may be used in examples shown in FIG. 12 or 14. For example, the number of encoders may be 8 or 16. Further, more efficient methods may be used to implement the algorithm shown in Equation 3 in hardware, which may employ shifters and/or adders instead of, or along with, multipliers.

Although exemplary embodiments of the present invention have been described with regard to voice, data, or video communications, it will be understood that exemplary embodiments of the present invention may be utilized in any suitable communications technique or combination thereof.

Although exemplary embodiments of the present invention have been described with regard to video ghosting and/or echoes, it will be understood that exemplary embodiments of the present invention may be utilized to reduce any form of fading and/or interference, as desired by one of ordinary skill in the art.

Although exemplary embodiments of the present invention have been described with regard to wireless modems and/or telephones, it will be understood that exemplary embodiments of the present invention may be utilized in any wireless or terrestrial communications system.

Although exemplary embodiments of the present invention have been described with regard to a trellis or viterbi decoder, it will be understood that any suitable decoder may be utilized as desired by one of ordinary skill in the art.

Although exemplary embodiments of the present invention have been described with regard to an 8-VSB trellis coded system for digital video broadcasting, it will be understood that exemplary embodiments of the present invention may be utilized in any suitable system for video, audio, and/or data systems.

Although exemplary embodiments of the present invention have been described with regard to an equalizer including twelve cells, it will be understood that any suitable number of cells may be utilized as desired by one of ordinary skill in the art.

As described above, according to exemplary embodiments of the present invention, the method of updating feedback filter coefficients using a DFE combined with a trellis decoder TCM may reduce the instability of the DFE, which may be due to the propagation of TCM decision errors, may improve the performance of the DFE combined with the trellis decoder TCM, and may enhance the performance of, for example, HDTV 8-VSB receivers.

While the present invention has shown and described with reference to exemplary embodiments thereof, it will be understood by those of ordinary skill in the art that various changes in form and details may be made therein without departing from the spirit and scope of the present invention as defined by the following claims.

What is claimed is:

1. An equalizer comprising:
a decoder configured to output a plurality of decisions; and
a first filter including a plurality of cells and an adder, each of the plurality of cells being configured to generate an output, and the adder being configured to add the outputs from the plurality of cells, each of the plurality of cells including an updater for updating one of a plurality of filter coefficients and a coefficient multiplier for multiplying a decision by a corresponding filter coefficient to generate a result, each of the updaters including,
a first multiplier adapted to multiply one of the decisions of the decoder by a first value;
a second multiplier adapted to multiply one of the filter coefficients by a constant, the constant being proportional to a reliability of the decision that corresponds to a traceback depth of the decoder; and
a first adder adapted to add an output of the first multiplier and an output of the second multiplier and update the filter coefficient.

2. The equalizer of claim 1, wherein the decoder is a trellis coded modulation (TCM) decoder.

3. The equalizer of claim 1, further including,
a second adder adapted to subtract an output of the equalizer from one of the decisions of the decoder and generate an error signal; and
a third multiplier adapted to multiply an error signal generated from the second adder by a parameter and generate the first value.

4. The equalizer of claim 3, wherein the parameter is a stepsize parameter.

5. The equalizer of claim 1, wherein the plurality of cells include,
a first group of cells, which receive the decisions output from the
decoder and the output of the first multiplier; a second group of cells, each of which receives a value obtained; and
by delaying one of the decisions of the decoder.

6. The equalizer of claim 5, wherein each of the plurality of updaters update the filter coefficients in accordance with the equation, $$b_i^{(k+1)} = \alpha_i b_i^{(k)} + \mu e_k d_{k-i}, i=1, 2, \ldots, L_B, \text{ wherein}$$

$\alpha_i$ correspond to an i-th traceback depth, $b_i^{(k)}$ are i-th coefficients of the equalizer at a k-th iteration, $L_B$ is a number of filter coefficients, $d_k$ represents the decisions, $\mu$ is a parameter, and $e_k$ are error signals.

7. The equalizer of claim 5, further comprising a logic selector for calculating a set of constants, which satisfy the equation, $$\alpha_i = (1 + \mu E[u_i^2])^{-1}, \text{ wherein}$$

$E[u_i^2]$ is a variance of a plurality of decision errors.

8. The equalizer of claim 7, wherein the decision errors correspond to the i-th depth.

9. The equalizer of claim 7, wherein the logic selector is included in the first filter.

10. The equalizer of claim 7, wherein the logic selector further includes,
a plurality of squarers adapted to square values of the filter coefficients,
a plurality of first multipliers adapted to multiply the squared filter coefficients by constants,
a first adder adapted to add a plurality of outputs from the first multiplier,
an accumulator adapted to accumulate a plurality of outputs from the first adder, and
a comparison selector adapted to compare a plurality of values from the accumulator with a plurality of threshold values and select constants based on the comparison.

11. The equalizer of claim 8, wherein the logic selector further includes,
a plurality of squarers adapted to square values of the filter coefficients,
a plurality of first multipliers adapted to multiply the squared coefficients by constants,
a first adder adapted to add a plurality of outputs from the first multiplier,
an accumulator adapted to accumulate a plurality of outputs from the first adder, and
a comparison selector adapted to compare a plurality of values from the accumulator with a plurality of threshold values and select constants based on the comparison.

12. The equalizer of claim 10, wherein the coefficients satisfy an inequality.

13. The equalizer of claim 5, further including a second filter adapted output a signal to a fourth adder.

14. The equalizer of claim 5, wherein the decoder is a Viterbi decoder.

15. The equalizer of claim 3, wherein the decoder has N+1 traceback depths and the first filter receives N+1 groups of reliability coefficients,
wherein each of the N+1 groups of reliability coefficients has an N+1 value that corresponds to an Nth traceback depth,
and each decision that corresponds to the Nth traceback depth is input to an N+1th group of delay lines.

16. The equalizer of claim 15, wherein each of the plurality of updaters update the filter coefficients in accordance with the equation, $$b_i^{(k+1)} = \alpha_i b_i^{(k)} + \mu e_k d_{k-i}, i=1, 2, \ldots, L_B, \text{ wherein}$$

$\alpha_i$ are constants proportional to a reliability of the decisions that correspond to an i-th traceback depth, $b_i^{(k)}$ are i-th coefficients of the equalizer at a k-th iteration, $L_B$ is a number of filter coefficients, $d_k$ represents the decisions, $\mu$ is a parameter, and $e_k$ are error signals.

17. The equalizer of claim 15, further including a logic selector for calculating constants that satisfy the equation, $$\alpha_i=(1+\mu E[u_i^2])^{-1} \ (i=1, 2, \ldots, L_N),$$

wherein $E[u_i^2]$ is a variance of decision errors that correspond to the i-th depth.

18. The equalizer of claim 17, wherein the logic selector is included in the first filter.

19. The equalizer of claim 17, wherein the logic selector further includes,
a plurality of squarers for squaring values of the filter coefficients,
a plurality of first multipliers for multiplying the squared coefficients by constants,
a first adder for adding a plurality of outputs from the first multipliers,
an accumulator for accumulating a plurality of outputs from the first adder, and
a comparison selector for comparing a plurality of values from the accumulator with a plurality of threshold values and selecting constants based on the comparison.

20. The equalizer of claim 18, wherein the logic selector further includes,
a plurality of squarers for squaring values of the filter coefficients,
a plurality of first multipliers for multiplying the squared coefficients by constants,
a first adder for adding a plurality of outputs from the first multipliers,
an accumulator for accumulating a plurality of outputs from the first adder, and
a comparison selector for comparing a plurality of values from the accumulator with a plurality of threshold values and selecting constants based on the comparison.

21. The equalizer of claim 20, wherein the coefficients satisfy an inequality.

22. The equalizer of claim 15, further comprising a second filter adapted output a signal to a fourth adder.

23. The equalizer of claim 15, wherein the decoder is a Viterbi decoder.

24. The equalizer of claim 15, further including a stop-and-go (SAG) unit, which receives the decisions, detects unreliable decisions, and generates enable/disable signals such that the SAG unit disables adaptation if the decisions are not reliable, and updates filter coefficients if the decisions are reliable.

25. The equalizer of claim 24, wherein each of the plurality of updaters update the filter coefficients in accordance with the equation, $$b_i^{(k+1)}=\alpha_i b_i^{(k)}+\mu e_k d_{k-i}, \ i=1, 2, \ldots, L_B, \text{ wherein}$$

$\alpha_i$ are constants proportional to a reliability of the decisions that correspond to an i-th traceback depth, $b_i^{(k)}$ are i-th coefficients of the equalizer at a k-th iteration, $L_B$ is a number of filter coefficients, $d_k$ represents the decisions, $\mu$ is a parameter, and $e_k$ are error signals.

26. The equalizer of claim 24, further including a logic selector for calculating a set of constants that satisfy the equation, $$\alpha_i=(1+\mu E[u_i^2])^{-1} \ (i=1, 2, \ldots, L_B), \text{ wherein}$$

$E[u_i^2]$ is a variance of decision errors that correspond to the i-th depth.

27. The equalizer of claim 26, wherein the logic selector is included in the first filter.

28. The equalizer of claim 26, wherein the logic selector further includes,
a plurality of squarers for squaring values of the filter coefficients,
a plurality of first multipliers for multiplying the squared coefficients by constants,
a first adder for adding a plurality of outputs from the first multipliers,
an accumulator for accumulating a plurality of outputs from the first adder, and
a comparison selector for comparing a plurality of values from the accumulator with a plurality of threshold values and selecting constants based on the comparison.

29. The equalizer of claim 27, wherein the logic selector further includes,
a plurality of squarers for squaring values of the filter coefficients,
a plurality of first multipliers for multiplying the squared coefficients by constants,
a first adder for adding a plurality of outputs from the first multipliers,
an accumulator for accumulating a plurality of outputs from the first adder, and
a comparison selector for comparing a plurality of values from the accumulator with a plurality of threshold values and selecting constants based on the comparison.

30. The equalizer of claim 29, wherein the coefficients satisfy an inequality.

31. The equalizer of claim 24, further comprising a second filter adapted output a signal to a fourth adder.

32. The equalizer of claim 24, wherein the decoder is a Viterbi decoder.

33. A method of updating filter coefficients, the method comprising:
calculating a plurality of output error signals;
multiplying the output error signals by a parameter to generate a first result;
obtaining a first partial value by multiplying a delayed decoder decision by the first result;
obtaining a second partial value by multiplying a constant by a coefficient, the constant being calculated based on a variance of errors of decisions corresponding to an i-th traceback depth of the decoder; and
obtaining an updated value by adding the first partial value and the second partial value.

34. The method of claim 33, wherein the method is repeated for a plurality of filter coefficients.

35. The method of claim 33, wherein the constant is calculated by,
determining the variance of errors of decisions corresponding to the i-th traceback depth of the decoder,
multiplying the variance of the errors of the decisions by a parameter and generating a second result, and
obtaining the constant by adding the second result and 1 and taking the reciprocal of the result.

36. The method of claim 33, wherein the constant is selected by,
squaring each of the filter coefficients, multiplying the squared values by constants and generating a plurality of third results,
adding and accumulating the plurality of third results and comparing the accumulated values with threshold values, and
selecting the constant based on the comparison.

37. The method of claim 36, the coefficients satisfy an inequality wherein i is an i-th filter coefficient.

38. A filter for updating filter coefficients, the filter comprising:
a plurality of updaters including a first multiplier, a second multiplier, and an adder; wherein the first multiplier is adapted to multiply a decision output from a decoder and a first value, the second multiplier is adapted to multiply a filter coefficient by a constant, the constant being calculated based on a variance of errors of decisions corresponding to an i-th traceback depth of the decoder; and
a first adder adapted to add an output of the first multiplier and an output of the second multiplier and update a filter coefficient.

39. An updater for updating a filter coefficient, the updater comprising:
a first multiplier adapted to multiply a decision and a first value;
a second multiplier adapted to multiply a filter coefficient by a constant, the constant being calculated based on a variance of errors of decisions corresponding to an i-th traceback depth of a decoder; and
a first adder adapted to add an output of the first multiplier and an output of the second multiplier and update a filter coefficient.

40. A method of updating a filter coefficient, the method comprising:
multiplying a decision and a first value and generating a first result;
multiplying a filter coefficient by a constant and generating a second result, the constant being calculated based on a variance of errors of decisions corresponding to an i-th traceback depth of a decoder; and
adding the first result and the second result and updating a filter coefficient.

41. A method of selecting a constant, the constant being proportional to a reliability of the decision that corresponds to traceback depth of a decoder and provided to an updater which is multiplying a filter coefficient by the constant, the method comprising:
squaring a plurality of filter coefficient values;
multiplying a plurality of squared filter coefficients with a plurality of constants,
adding together the plurality of the multiplied values;
accumulating the added values; and
comparing the accumulated value with at least one threshold value and selecting the constant based on the comparison.

42. A logic selector implementing the method of claim 41.

43. A filter including the logic selector of claim 42.

44. An equalizer including the filter of claim 43.

45. An updater implementing the method of claim 40.

46. An equalizer including the updater of claim 45.

* * * * *